United States Patent [19]

Yajima

[11] Patent Number: 4,628,578
[45] Date of Patent: Dec. 16, 1986

[54] METHOD AND APPARATUS FOR AUTOMATIC PUNCHING

[75] Inventor: Toshio Yajima, Hiratsuka, Japan

[73] Assignee: Kabushiki Kaisha Komatsu Seisakusho, Tokyo, Japan

[21] Appl. No.: 640,772

[22] Filed: Aug. 14, 1984

[30] Foreign Application Priority Data

| Aug. 19, 1983 | [JP] | Japan | 58-151376 |
| Aug. 25, 1983 | [JP] | Japan | 58-131565[U] |
| Nov. 29, 1983 | [JP] | Japan | 58-184454[U] |
| Dec. 14, 1983 | [JP] | Japan | 58-192814[U] |

[51] Int. Cl.⁴ .................... B23Q 17/00; B26D 5/00; B26D 5/38
[52] U.S. Cl. ........................ 29/407; 83/367; 83/371
[58] Field of Search ............... 83/367, 371, 360, 365, 83/410, 412–415, 19, 20, 24, 26, 30, 32; 29/407

[56] References Cited

U.S. PATENT DOCUMENTS

| 3,342,997 | 9/1967 | Taylor et al. | 83/521 |
| 3,890,862 | 6/1975 | Lhenry | 83/410 |
| 4,086,836 | 5/1978 | Jensen | 83/521 |
| 4,131,918 | 12/1978 | Pettit | 83/367 |
| 4,327,615 | 5/1982 | Gerber et al. | 83/520 |
| 4,399,675 | 8/1983 | Erdmann | 83/367 |
| 4,409,718 | 10/1983 | Pryor | 29/407 |
| 4,434,693 | 3/1984 | Hosoi et al. | 83/410 |
| 4,463,677 | 8/1984 | Kushfuss | 83/371 |

FOREIGN PATENT DOCUMENTS 2034025  5/1980  United Kingdom ............ 271/227

Primary Examiner—Howard N. Goldberg
Assistant Examiner—Steven Nichols
Attorney, Agent, or Firm—Diller, Ramik & Wight

[57] ABSTRACT

A sheet of material is printed with a plurality of printed portions to be punched as a plurality of positioning marks near said printed portions. A camera is provided for a press machine for detecting center positions of the mark and the printed portions are positioned at a punching portion of the press based on the detected center positions Vacuum sucking means are provided to such the sheet mounted on a table and obliquely moving the sheet until its edge engages a stop member which corrects the attitude of the sheet. When a defective printed portion is detected, punching thereof is prevented. The apparatus is constructed to minimize the stroke of movement of the sheet during the steps of supplying and positioning it to the press machine and discharging a scrap remaining after punching the sheet.

7 Claims, 49 Drawing Figures

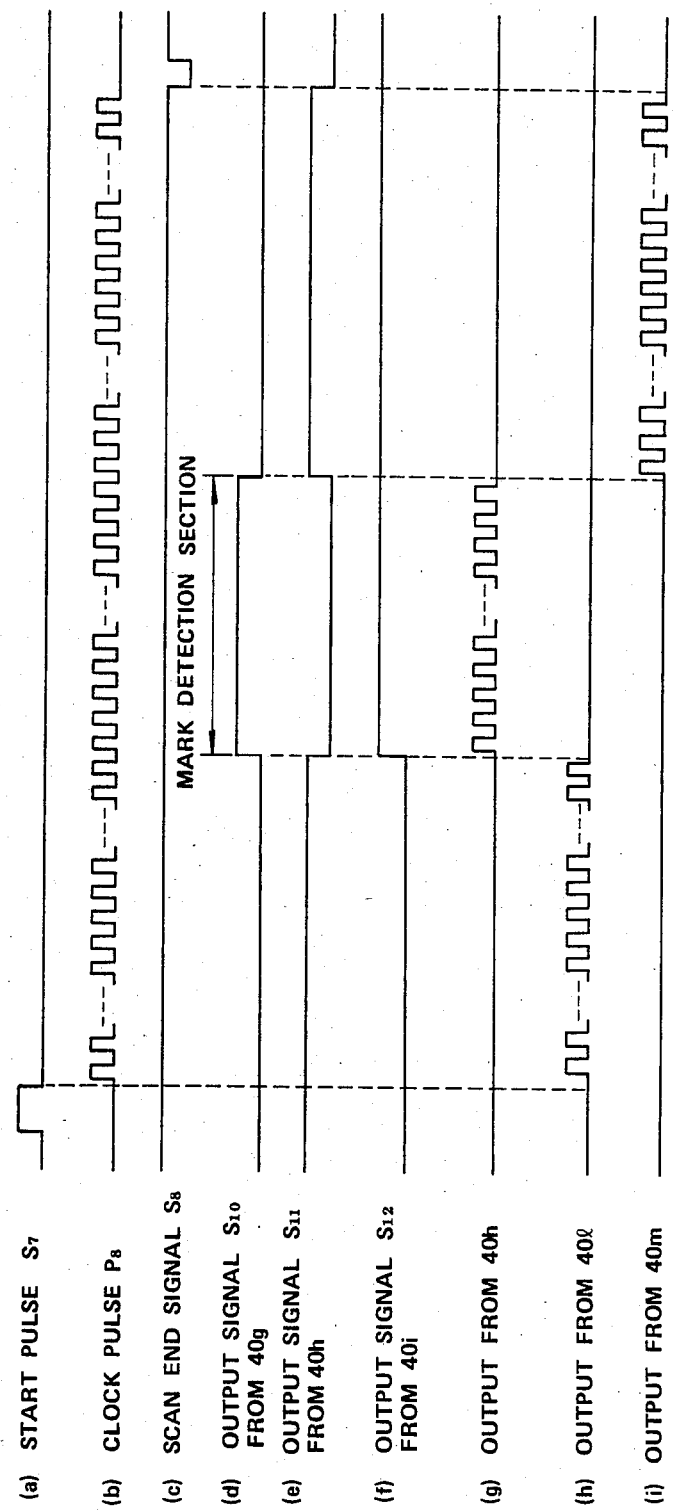

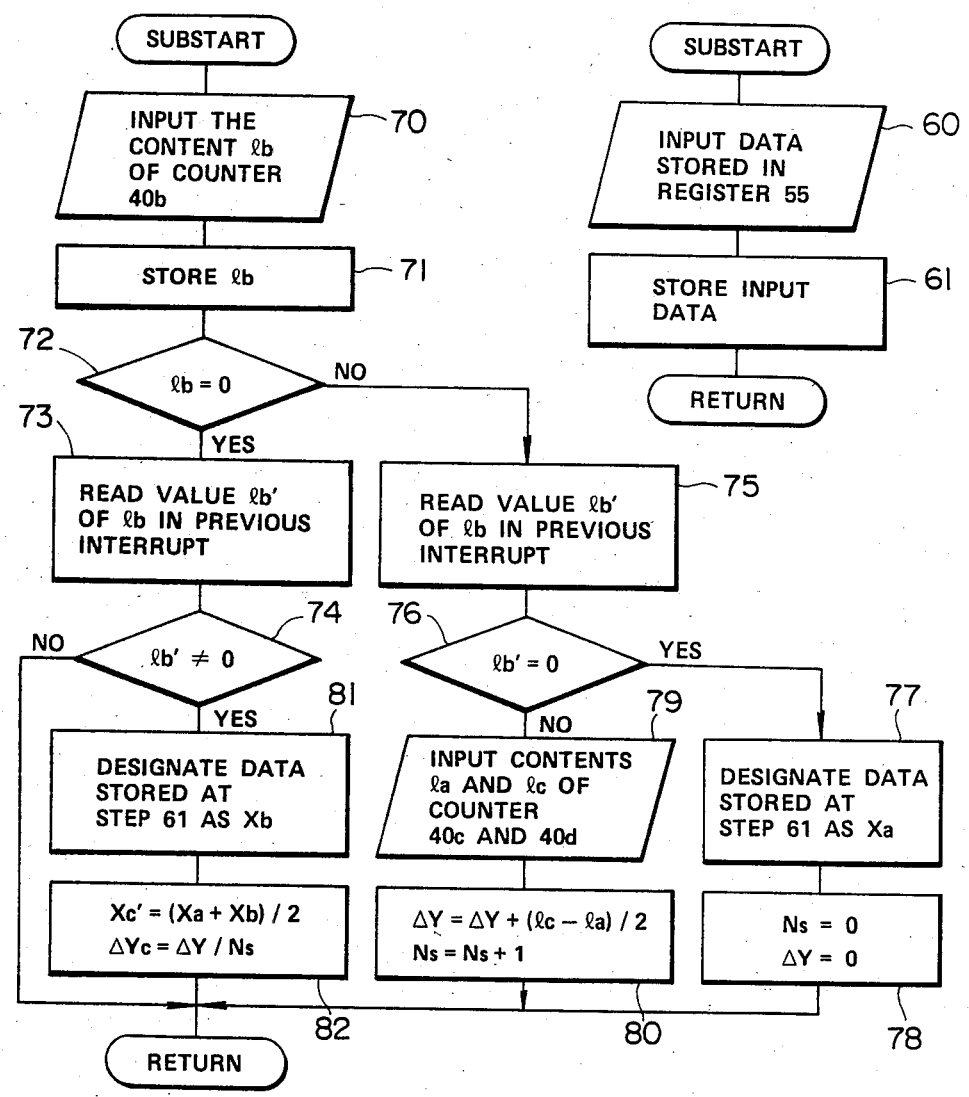

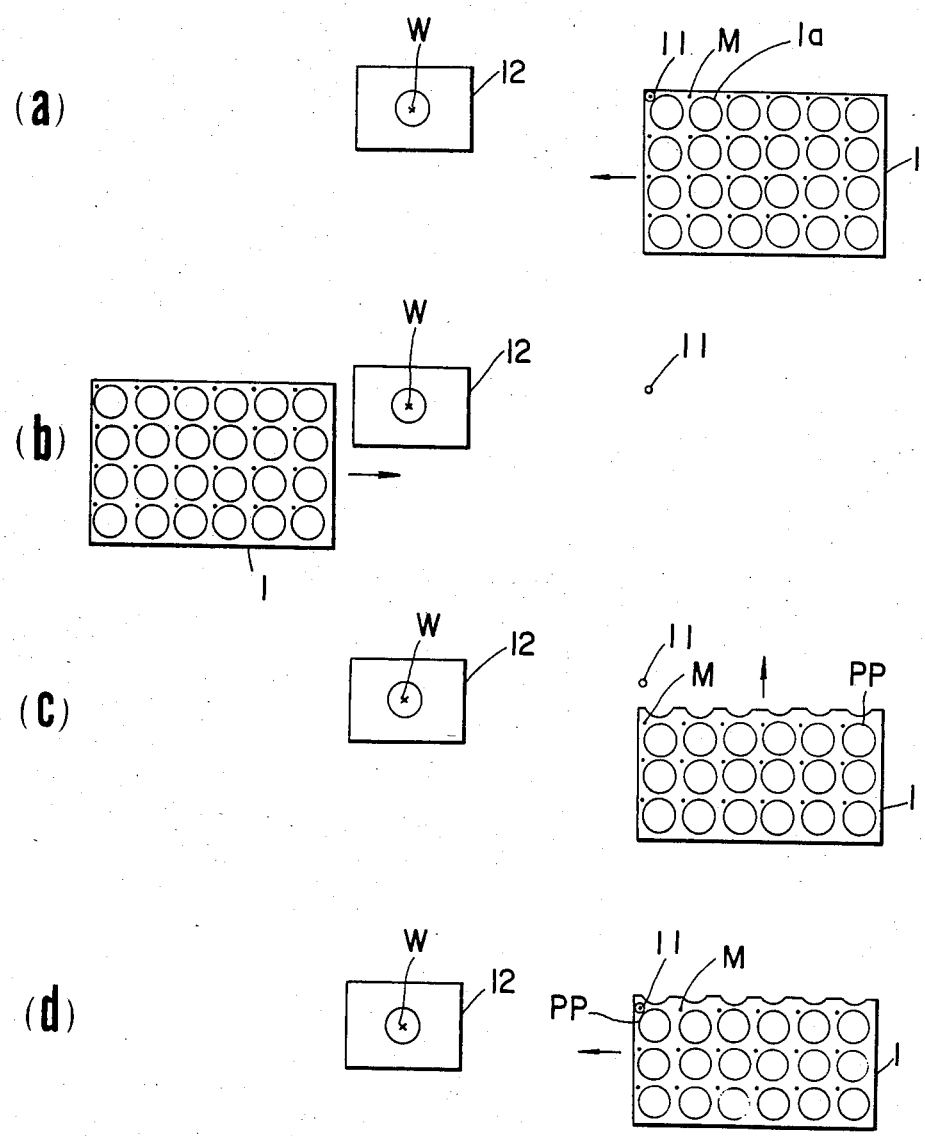

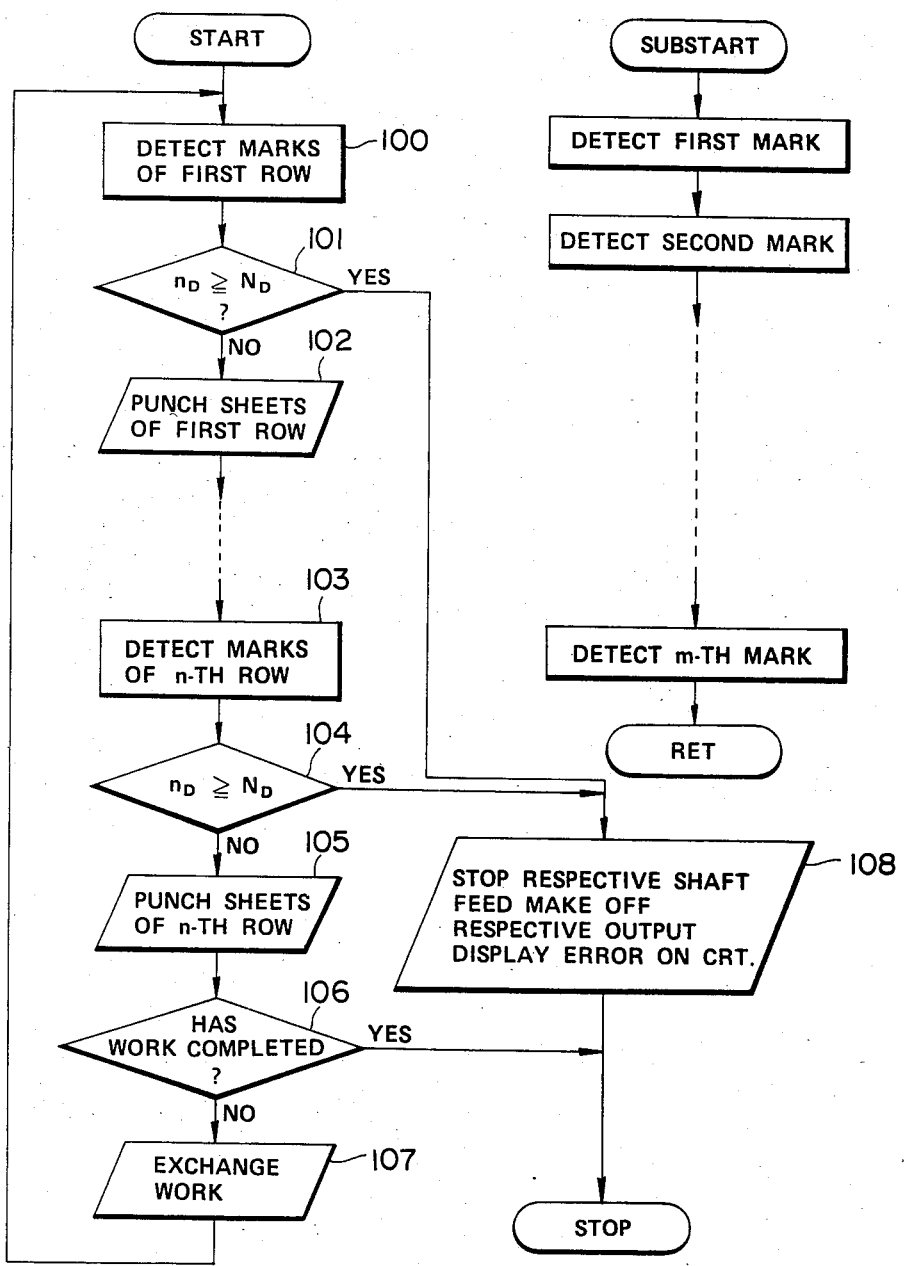

| | | | | | | |
|---|---|---|---|---|---|---|
| N0001 | G49 | | N2010 | G42 | | |
| N0005 | G40 | | N2020 | G00 | X($X_{p1}$) Y($Y_{p1}$) | |
| N0010 | G00 | X($X_{s1}$) Y($Y_{s1}$) | N2030 | M03 | | |
| N0015 | M10 | | N2040 | G00 | X($X_{p2}$) Y($Y_{p2}$) | |
| N0020 | M81 | | N2050 | M03 | | |
| N0030 | G01 | X($X_{E1}$) | | . | | |
| (N0035 | M80) | | | . | | |
| N0040 | G00 | X($X_{s2}$) Y($Y_{s2}$) | N3000 | M12 | | |
| N0050 | M81 | | N3010 | M02 | | |
| N0060 | G01 | X($X_{E2}$) | | | | |

.
.
.

N0900  M11

.
.

N1010  G43
N1020  G00  X($X_{pn}$) Y($Y_{pn}$)
N1030  M03
N1040  G00  X($X_{pn-1}$) Y($Y_{pn-1}$)
N1050  M03

.
.
.

METHOD AND APPARATUS FOR AUTOMATIC PUNCHING

BACKGROUND OF THE INVENTION

1. Field of Invention

This invention relates to a method and apparatus for automatically punching or pressing products out of sheet material positioned by using a visual sensor.

2. Description of the Prior Art

When working material with a press machine, it is usual to supply the sheet of material to the press machine such that the working reference center of the material would coincide with the working position of the press, for example a die center. Especially, when punching a plurality of printed patterns from a sheet of material or a work piece with the press machine, it is necessary to accurately position the material with reference to the press machine.

According to a prior art method of press punching, at a first step (I), a sheet of material 1 on which a plurality of printed portions 1a and a plurality of marks M utilized to position the sheet at the time of punching the printing portions 1a are printed is divided in to a plurality of sections which a shear as shown in FIG. 1, at a second step (II), guide openings M' are formed through each divided section with a table type drill according to the marks M, and at step (III) guide pins 2a of the metal mold 2 of the press machine are inserted into the guide openings for positioning printed portions 1a, thus punching products 3.

With such prior art method, however, it is difficult to continuously feed the sheet of material to the press machine. Moreover, as it is necessary to form guide openings through the sheet of material, there is a defect that the working efficiency is low.

To solve these problems, an improved method of supplying the material has been proposed as disclosed in U.S. patent application Ser. No. 535,677 and West Germany Patent Application No. 33351643 in which the material is positioned by using a visual sensor.

This improved method of feeding a sheet of material will be described with reference to FIG. 2. More particularly, a sheet of material 1 is moved in the X and Y directions of rectangular coordinates by a material feed device 20, thus feeding the sheet of material 1 to a press machine 10 provided with a camera 11. The material feed device 20 will be described in more detail with reference to FIG. 3.

In this device, a beam 22 is mounted on rails 21a and 21b on the opposite sides of the device and moved along the rails in the Y direction by rotating a ball screw 23. A clamper carrier 24 is suspended from the beam 22, which is moved along the beam in the X direction. The clamper carrier 24 is provided with clampers, not shown, for clamping therebetween the sheet of material 1. With this material feed device the sheet of material 1 can be moved in X and Y directions along a supporting table 25. In order to move smoothly the sheet of material 1 on the supporting table 25, supporting balls B1–B25 are embedded in the supporting table 25.

As shown in FIG. 4, each supporting ball B is biased upwardly by a spring S and can rotate in any direction. The ball is pushed down when a force larger than a predetermined value is applied thereto. Normally, the ball B projects from the surface of the supporting table by a height h which coincides with the material clamping surface of the pawls 26b of the clamper 26. The clamping pawls 26b are caused to clamp or release the sheet 1 by driving the pawls 26b in the direction A or B by a pneumatic cylinder 26c.

Consequently, when the ball B is completely projected upwardly, the sheet of material 1 can slide on the ball and the work clamper 26 pass over the ball B while depressing the ball B by an amount equal to the plate thickness of the pawls 26b. This construction enables to move flat sheet of material on the supporting plate 25 without dropping or damaging the material.

As shown in FIG. 5, the supporting table 25 is provided with a suction transport mechanism located beneath the table 25 and a stop member 28 at the righthand end thereof so that the clampers 26 can automatically and accurately clamp the sheet of material 1 at a correct attitude.

The suction transfer mechanism 27 includes movable tables 271 and 272. The lower ends of the opposite ends of the table 27 are fit on guide grooves 274 and 275 provided in the X direction for a box shaped base frame 273, whereas the lower projections 278 and 279 of the table 272 are received in guide prooves 276 and 277 formed in the Y direction for the table 272.

The base frame 273 is provided with a pneumatic cylinder 280 extending in the X direction, while a pneumatic cylinder 28 is mounted on the table 271 to extend in the Y direction. The piston rod of the pneumatic cylinder 280 is connected to table 271, while the piston rod the pneumatic cylinder 281 is connected to the table 272.

Horizontally spaced apart pneumatic cylinders 282 and 283 are secured vertically on the table 272 and vacuum cups 284 and 285 are attached on the upper ends of their piston rods.

Since the suction transfer mechanism 27 has a construction as above described, by operating cylinders 280 and 281 the vacuum 284 and 285 can be moved simultaneously in X and Y directions by distances corresponding to the strokes of the pistons of the pneumatic cylinders. Moreover, by actuating pneumatic cylinders 282 and 283, the vacuum cups 284 and 285 are raised or lowered.

Turning back to FIG. 2, rectangular windows 29a and 29b are provided for the table 25 for permitting vacuum cups 284 and 285 to project above the table and for moving these cups in the X and Y directions.

The operation of the suction transfer mechanism 27 will now be described. Suppose now that the sheet of material 1 has been brought on the table 25 as shown in FIG. 6a by a suitable transfer device, not shown. Then the vacuum cups 284 and 285 will project beyond the surface of the table 25 to suck the lower surface of the sheet 1. Then, the cylinder 281 is actuated to move the vacuum cups in the Y direction together with the sheet 1 until its righthand edge comes to abut the stop member 28, whereby the attitudes of the sheet 1 is corrected. Then the vacuum cups 284 and 285 are moved in X direction by the pneumatic cylinder 50 so that the front edge of the sheet 1 engages the base portions of the clamping pawls 26a to correctly position the sheet 1 as shown in FIG. 6c. In this manner, the suction transfer mechanism 27 and the stop member 28 act as a positioning means of the sheet.

The sheet 1 thus positioned is clamped by clamping pawls 26a and 26b and then moved in X and Y directions by the clamp carrier 24.

To correctly position the sheet 1, at first, the position of the sheet 1 is coarsely adjusted such that its mark M would lie in the field of view of camera 11, as shown in FIG. 7. Then sheet 1 is moved in X direction from a position Xs to XE (which is called subscanning) and at the same time the sheet is scanned by a visual sensor in Y direction in a predetermined field of view, this scanning being called a main scanning.

The deviation x, in the direction of X between the center Xc of the sub-scanning and the center C of the mark M is detected by the difference the mean value of a sub-scanning position Xa at which the mark X is detected first and a sub-scanning position Xb at which the mark M is detected at the last, and the center position Xc of the sub-scanning. The deviation y in Y direction between the center position Ys of the main scanning and the center position C of the reference mark M is detected by the mean value of the difference between distance la between the upper limit of the field of view at the time of main scanning and the reference mark M, and the distance lc between the periphery of the reference mark M and the lower limit of the field of view.

Since the positional relation between the punching center W of the press machine 10 and the camera 11 is preset, at the time of supplying the sheet to the punching center W, the preset amount of movement is corrected by the detected deviation ΔX in the X direction and the deviation ΔY in the Y direction so as to supply the sheet with the corrected amount of movement.

The method of detecting the deviations ΔX and ΔY and the method of supplying the sheet will be described in detail with reference to FIGS. 8 through 12.

FIG. 8 shows a block diagram of the control system of the automatic punching apparatus shown in FIG. 2 in which a sensor control unit 40 is used for outputting a scanning instruction signal S1 to the camera 11 and for processing an image signal S2 picked up by the camera 11 in a manner to be described later. The output of the sensor control unit 40 is fed to a central processing unit (CPU) through a sensor interface and a bus line 42. A X unit drive unit 44 is used for driving the clamper carrier 24 shown in FIG. 2 and is constituted by a drive shaft 44a threaded into a threaded member 24a provided for the clamper carrier 24 for moving the same, an electric motor 44b for driving the drive shaft 44a, a pulse encoder 44c coupled to the drive shaft 44a for generating two pulse signals P1 and P2 having the same waveform but having different phases, a speed detector 44d driven by the motor 44b for generating a signal proportional to the rotational speed of the motor, and a servo-amplifier 44e supplying a drive signal to the drive motor 44b.

A Y axis drive unit 45 is provided for driving the beam 22 and table 25 shown in FIG. 2 and is constituted by an electric motor 45a for driving a drive pulley 23a, a pulse encoder 45b coupled to the motor 45a for generating two pulse signals P3 and P4 having the same wormform but having different phases, a speed detector 45c detecting the rotational speed of the motor 45a and a servoamplifier 45d supplying a drive signal to the motor 45a.

The speed detector 44d, and servoamplifier 44e; speed, detector 45c and servoamplifier 45d respectively constitute a speed feedback loops.

Pulse outputted by the pulse encoders 44c and 45h are applied to forward and reverse rotation judging circuit 46 and 47 respectively. These judging circuits 46 and 47 judge whether motors 44 and 45 rotate forwardly or reversely in accordance with the phase relation between pulse signals P1 and P2 and that between pulse signals P3 and P4. When it is judged that the motors are rotating in the forward direction, the judging circuits output signals S3 and S4 of a logic level H. Furthermore the judging circuits output movement pulse signals P5 and P6 respectively showing that X and Y axes have moved one step each time a predetermined number of pulse signals P1 (or P2) and pulse signals P3 (or P4) are inputted. Signal S3 and pulse signal P5 are applied to the control input terminal U/$\overline{D}$ and clock input terminal of a up down counter 48, and to a sensor control unit 40, while signal S4 and pulse signal P6 are applied to the control input terminal U/$\overline{D}$ and clock input terminal CK of a up down counter 49.

The outputs of up down counters 48 and 49 are applied to CPU 43 via bus line 42 to act as X axis position data and Y axis position data respectively. Based on the X axis position data and the Y axis position data, CPU 43 calculates position deviation data for each shaft and supplies the calculated data to the servoamplifiers 44 and 45 respectively via bus line 42, D/A converters 50 and 51 and preamplifiers 52 and 53.

The press machine 10 works a single sheet of material 1 to form a plurality of products. As shown in FIG. 1, the sheet is formed with circular marks M near portions of the sheet 1, to be punched, the marks having reflective index different from that of the sheet 1. The positions of these marks are prestored in a memory device 54 as X and Y rectangular coordinate data of the material supply device 22 representing the position of the sheet 1 when it is clamped by the clamper 26 at a predetermined portion. Due to the sitting error of the sheet 1 or misalignment of prints, the coordinate data do not accurately represent the center positions of the marks. For this reason, it is necessary to correct the positions as will be described later.

At first, the CPU 43 roughly determines the position of the sheet of material 1 based on the coordinate data. At this time, the line image sensor photographs the position Xs on the sheet of material 1 shown in FIG. 7 for a line length V. The CPU 43 operates the sensor control unit 40 and the X axis drive mechanism 44 to measure the center position of the mark M.

As shown in FIG. 9, the sensor interface 41 comprises a flip-flop circuit 41a and bus buffer memory devices 41b, 41c and 41d. The output terminal Q of the flip-flop circuit 41a is connected to one input of an AND gate circuit 40a comprising the sensor control unit 40, while the output terminals Q of counters 40b, 40c and 40d are connected to the input terminals A of the bus buffer memory devices 41b 41c and 41d respectively.

The output signal S3 of the forward and reverse rotation judging circuit 46 and the pulse signals are supplied to respective inputs of an AND gate circuit 40e, the output terminal thereof being connected to the other input terminal of the AND gate circuit 40a. The output signal of the AND gate circuit 40a is supplied to the scanning control unit 11a of the camera 11 to act as the scanning control signal S1. Further, the output of the AND gate circuit 40a is converted into a signal S5 by a delay waveform shaping circuit 40 and then supplied to the latch instruction input terminal L of the register 55 and to the CPU 43.

When supplied with signal S1, the scanning control unit 11a applies a scanning pulse P7 to the line image sensor 11b for sequentially scanning light receiving cells thereof. Further, the scanning control unit 11a judges that whether an image signal S6 outputted from the line image sensor 11b represents a bright portion or not. When the image signal represents the bright portion, the scanning control unit 11a produces a bright portion signal S2a, but if not produces a dark portion signal S26. The scanning control unit 11a produces a start signal S7 and an one scanning termination signal S8 respectively at the times of starting and terminating the scanning, and a clock signal P8 synchronous with the scanning of the line image sensor 11b. Where the reflection index of the mark M is smaller than that of the sheet 1, the scanning control unit 11a produces a signal S9 of logic level H. The optical system 11c focusing a picture image on the light image sensor 11b is constituted by a combination of lenses.

Signal S2a is applied to the input terminal A of a selector 40g and to the input terminal B of a selector 40h. Signal S2b is applied to input terminals B and A of the selectors 40g and 40h respectively, while signal S9 is supplied to the control input terminals S of the selectors 40g and 40h respectively. Signal S7 is applied to reset terminals R of counters 40b, 40c and 40d and flip-flop circuit 40i. Signal S8 is supplied to the CPU 43 via an inverter 40j, while the clock signal P8 is applied to one inputs of AND gate circuits 40k, 40l and 40m. The output signal S10 of the selector 40g is applied to the set terminal S of the flip-flop circuit 40i and to the other input terminal of the AND gate circuit 40k, while the output signal S11 of the selector 40h is applied to the other input terminals of AND gate circuits 40l and 40m. The output signal S12 of the flip-flop circuit 40i is applied to the other input terminal of the AND gate circuit 40m and to the other input terminal of the AND gate circuit 40l.

When the reflective index of the mark M is smaller than that of the sheet 1 (that is when the mark M is made of black and lusterless paint or the like) and when the line image sensor 11b is scanning a X coordinate Xi including mark M, the scanning control unit 11a changes the logic level of the signal Se to L whereby selectors 40g and 40h output signals applied to their input terminals B from their output terminals.

The flip-flop circuit 41a has already been set by CPU 43 so that the time of positioning the sheet, the flip-flop circuit 41a outputs a signal S1 to the scanning control unit 11a corresponding to signal P5 outputted from the forward reverse judging circuit 46.

As a consequence, the scanning control unit 11a produces a start pulse S7 as shown in FIG. 10a to reset the flip-flop circuit 40i, counters 40b, 40c and 40d and then outputs a scanning pulse P7 to the line image sensor 11b to cause it to scan from point PA, and a clock signal P8 (FIG. 10b) synchronous with the scanning pulse P7.

The line image sensor 11b generates a signal S6 which represents a bright portion while scanning between points PA to PB and between point PC and end point, and represents a dark portion while scanning between points PB and PC. Consequently, the scanning control unit 11a produces a signal S2a which becomes H level during the scanning between points PB and PC and signal S26 which becomes H level during the scanning between points PA and PB and between point PC and the end points.

Thus, the output signals S10, S11 and S12 of the selectors 40g and 40h and flip-flop circuit 40i become as shown in FIGS. 10d, 10e and 10f respectively with the result that the clock signals outputted by AND gate circuits 40k, 40l and 40m change as shown in FIGS. 10g, FIG. 10h and FIG. 10i respectively.

Accordingly, the counts of counters 40b, 40c and 40d respectively represent the distance lb between points PB and PC (the length of mark M along coordinate X1), the distance la between points PA and PB (the distance between the scanning starting point along the coordinate X1 and the upper most portion of mark M) and the distance lc between point PC and the scanning end point (the distance along coordinate X1 between the lowermost portion of mark M and the scanning end point).

Signal S8 (see FIG. 10c) outputted from the scanning control unit 11a at the time of terminating the scanning is inverted by inverter 40j to produce a signal 8 which is applied to CPU 43 as a first interruption signal.

The signal S5 outputted by the delay waveform shaping circuit 40f builds up at a point later by than the build down point of signal S1 to become H level for a predetermined time. This signal stores the count (representing X1 which is the X coordinate at this time) in the register 55. The signal S5 acts as a second interruption signal for CPU 43 so that the CPU 43 takes the data stored in the register 54 into its input 60 to store the data in the memory device 54 (step 61). Then the program is returned to the original state.

Where the reflective index of the mark M is higher than that of the sheet 1, the logic level of the signal S9 becomes H. Thereafter, processings similar to those described above are executed.

Each time the first interruption signal $\overline{S8}$ is applied, CPU 43 executes a control as shown in FIG. 12 to detect the position of the center position of mark M.

More particularly, at step 70, the content of the counter 40b, that is the distance lb is inputted for storing the same in a predetermined region of the memory device 54 at step 71.

In an area between the subscanning starting position Xs and the coordinate position Xa, since the mark M does not present, the distance lb is zero. As a consequence, the result of judgment at step 72 as to whether the distance lb is zero or not becomes YES. Then, at step 73, the content of the counter 40b, that is distance lb which has been stored at the time of previous interruption is read out. Since l'b is also zero, the result of judgment at step 74 as to whether the distance l'b is zero or not becomes NO. Accordingly, the CPU 43 returns to the processing of the main routine which CPU 43 has been processed before occurrence of an interruption.

At the coordinate Xa corresponding to an edge of mark M, since distance lb is not zero, the result of judgment at step 72 is NO. Moreover, since distance l'b read out at step 72 is identical to step 73 is also zero, the result of judgment at step 76 as to whether distance l'b is zero or not becomes YES. At step 77, CPU 43 stoes the data stored at step 61, that is the data stored in the register 55 in the memory device 54 as the coordinate Xa. At step 78, a zero is substituted for variables Ns and ΔY so as to reset these variables. Thereafter the program returns to the processing of the main routine.

In a region in which the mark M presents, since both lb and l'b are not zero, the results of judgments executed at steps 72 and 76 are both NO. Accordingly, the counts of counters 50a and 40d, that is the data regarding distances la and lc are applied to CPU 43 at step 79 so that the value of ΔY is updated according to the following equation and the value of the variable Ns is incremented by 1.

$$\Delta Y = \Delta Y + \frac{l_c - l_a}{2} \quad (1)$$

Thereafter the program returns to the main routine.

At a coordinate Xb representing an edge of mark M opposite to that represented by coordinate Xa, since distance lb is zero and since distance l'b is not zoro, the result of judgment executed at step 72 becomes YES and the result of judgment executed at step 74 also becomes YES. Accordingly, at step 81, the data stored in the register 55 at step 61 is read out and stored in the memory device 54 as a coordinate Xb. Then at step 82 deviations ΔXc and ΔYc of the X and Y coordinates of the center position of mark M are calculated according to the following equations (2) and (3) and these calculated deviations ΔXc and ΔYc are stored at step 82.

$$\Delta X_c = \frac{X_a + X_b}{2} - X_c \quad (2)$$

$$\Delta Y_c = \frac{\Delta Y}{N_s} \quad (3)$$

Thereafter the program returns to the main routine.

The area between the coordinate Xb and coordinate Xe, that is the end point of sub-scanning is processed in the same manner as the area between coordinates Xs and Xa.

The CPU 43 corrects the data prestored in the memory device 54 based on the deviations ΔXc and ΔYc thus calculated, and then determins the position based on the corrected position coordinates, thus enabling to correctly set the printed position at the punching center W of the press machine 10.

Where printed portions formed on the sheet 1 in a plurality of rows as shown in FIG. 13 are to be punched with press machine 10, the CPU 43 controls the press machine 10 and the material supply device 20 in the following manner.

More particularly, regarding the first row marks M, the CPU 43 sequentially detects deviations ΔXc and ΔYc of the X and Y coordinates of the actual center position with respect to the prestored reference position, starting from the left end mark M (see FIG. 13b). At this time, the CPU 43 holds the press machine 10 at its upper dead center.

Then by using the deviations ΔXc and ΔYc, the CPU 43 sequentially positions the printed portions 1a at the punching center W of the press machine starting from the rightmost printed portion 1a of the first row and causes the press machine to sequentially punch (see FIG. 13b). When positioning the printed portions 1a the coordinates of the reference positon of each printed portion 1a are corrected by the deviations ΔXc and ΔYc.

Then CPU 43 moves the sheet 1 in a direction shown by an arrow in FIG. 13c so as to position the left end mark M of the second row at a positon just below camera 11 (see FIG. 13d) so as to control the printed portions 1a of the second row for punching them with the press machine 10.

In the same manner, the CPU 43 causes the press machine 10 to sequentially punch printed portions 1a of the third and following rows.

In accordance with the crank angle rotation data applied from the press machine 10 via input interface 56 and bus line 42, the CPU 43 controls the positioning of the sheet 1 in synchronism with the operation of the press machine 10. Also the CPU 43 supplies a upper dead center stop instruction to the press machine 10 via bus line 52 and output interface 57 to stop the crankshaft of the press machine 10 at the upper dead center.

Generally, before press work, the printed sheet 1 (see FIG. 1) is inspected by eyes of the operator and printed portions 1a of deficient printing or having defects are marked with X. For the purpose of not punching such defective printed portions 1a, a method has been proposed in which before starting the punching operation, the position data regarding defective printed portions 1a are stored by using an operating pawl or the like so that positioning would not be made at memory areas storing defective printed portions.

This method, however, requires much time for inputting position data of defective printed portions. Moreover, inputting of the position data is not only troublesome but also accompanies input errors.

In a system wherein positioning is made by using a visual sensor, when it does not operate normally, it is difficult to accurately determine the center position of the mark, thus causing erroneous punching.

Moreover, for positioning the sheet 1 to the clamper 26, vacuum cups 284 and 285 are moved in two directions of X and Y so that it is necessary to use independent cylinders 280 and 281 for the two directions. As a consequence, the construction of apparatus comprising electromagnetic valves and electric circuits that control the cylinders becomes complicated and expensive.

Since a force is not applied to the sheet in the Y direction while the vacuum cups 284 and 285 are being moved in X direction, position of the sheet 1 will be shifted more or less to the left as viewed in FIG. 6c. In addition, there are the following problems. More particularly the sheet lis generally applied with a vinyl cover for protecting the printed surface and in many cases the edges of the cover project beyond the edges of the printed surface. For this reason, with prior art means for positioning sheet 1 with respect to clamper 26, the projected cover portion would be clamped between the right side edge of the sheet 1 and stop member 28 with the result that the sheet 1 would be displaced to the left by the cover at a stage for assuming the state shown in FIG. 6c.

Where the clamper 26 clamps the sheet 1 in an inclined state as shown in FIG. 14 or where not aligned printings are made on the sheet 1 as shown in FIG. 15, even when the center position of the mark is accurately determined with a visual sensor, correct punching could not be made.

More particularly, when the center position of the marks at both ends of the sheet 1 are caused to shift by Δy in Y direction as shown in FIG. 16 due to not aligned printings, the printed portion 1a to be punched would shift from a position shown by dot and dash lines to a solid line position as shown in FIG. 17. Let us denote the distance between marks M at the opposite ends by l, the distance between a mark M and the center of a printed portion 1a by X, punching error in X direction by Δx, and the punching error in Y direction by Δy. Then from the relation between FIGS. 10 and 17 the following equation holds $$l:\Delta y = x:\Delta x \quad (4)$$

By modifying this equation with reference to Δx, we obtain $$\Delta x = \frac{\Delta y \cdot x}{l} \quad (5)$$

Putting l=1000 mm, x=25 mm and Δy=1 mm, from equation (5) we can obtain X=25 microns. In other words, even when the center position of the mark is accurately detected, at a position spaced 25 mm from the center of the mark, a punching error of 25 microns in the X direction is inevitable.

The camera 11 utilized in the automatic punching system has a resolution of 0.025 mm and since the depth of view photographed without blurring the picture image is only ±0.6 mm, when the thickness of the sheet 1 varies by more than ±0.6 mm, it is impossible to obtain accurate picture images, thus failing accurate positioning.

To obviate this problem, apparatus has been proposed wherein the camera is moved in the vertical direction in accordance with the thickness of the sheet so as to automatically focus the camera.

Although this apparatus can automatically focus, it is necessary to use a motor for vertically moving the camera, position detector, etc., thus increasing the size and cost. Where the thickness of the sheet does not vary appreciably, it is advantageous to manually adjust the camera.

Where supporting balls B1–B25 are arrayed as shown in FIG. 3, there is the following difficulty when the center position of the positioning mark is detected by the camera.

Thus, as shown in FIG. 18, when an end of the sheet 1 is brought between supporting balls B2 and B3, since the sheet 1 is thin it droops owing to the weight thereof so that the surface position of the sheet 1 displaces by Δl with reference to the optical axis of the camera with the result that the focal point of the camera is displaced, thus blurring the picture image. Especially, in a material supply apparatus with visual sensing performance, since the center position of the position determining mark is detected at a resolution of 25 μm/bit, it is necessary to photograph from a position of short distance. As a consequence, the focal depth is very shallow of the order of ±1 mm, whereby it is greatly influenced by the drooping of the sheet 1.

SUMMARY OF THE INVENTION

A first object of this invention is to provide an automatic punching method wherein the center position of a mark of a sheet of material is detected, the sheets are successive by positioned to a press working position based on the detected mark center position, and after punching all printed portions, the remaining portions of the sheets, that is scraps are discharged, and wherein the amount of feed of the material can be minimized during respective steps described above.

A second object of this invention is to provide an automatic punching method wherein position data are not assigned to previously checked defective printed portion, thereby discriminating normal printed patterns.

A third object of this invention is to provide an automatic punching method capable of automatically detecting a case in which a visual sensor does not operate normally so as to imform an abnormal condition and then stop the punching operation.

A fourth object of this invention is to provide an automatic punching apparatus provided with positioning means that can accurately position a sheet of material to be punched with respect to clampers, and having a simple construction.

A fifth object of this invention is to provide automatic punching apparatus capable of preventing erroneous punching due to not aligned printings on the sheet of material.

A sixth object of this invention is to provide automatic punching apparatus provided with a simple focus adjusting means of a visual sensor capable of manually focusing the visual sensor and capable of adjusting it readily.

A seventh object of this invention is to provide automatic punching apparatus provided with a supporting table capable of preventing drooping of the material in the field of view of the visual sensor.

According to one aspect of this invention there is provided an automatic punching method comprising the steps of clamping with clamping means a sheet of material printed with a plurality of printed portions to be punched and a plurality of positioning marks near the printing portions, the printing portions and the marks being arrayed in a plurality of rows; moving the clamping means in X and Y directions of rectangular coordinates; detecting center positions of the marks with a visual sensor mounted on a press machine; positioning the printed portions in the press machine based on the detected mark center positions; and punching the printed portions out of the sheet of material, characterized by comprising the steps of moving the clamping means to a predetermined position for discharging a scrap of the sheet remaining after punching the printed portions of the last row; positioning one end of the scrap held by the clamping means and the visual sensor on the opposite sides of a punching position; reversely feeding the sheet at the time of positioning the printed portions except those of the last row; the direction of the reverse feeding being opposite to that at the time of detecting the center positions of the marks; when the length of the sheet is shorter than a distance between the one end of the scrap and the visual sensor, forwardly feeding the sheet in the same direction as in a case of detecting the center positions of the marks; whereas when the length of the sheet is shorter than the distance, reversely feeding the sheet.

According to another aspect of this invention there is provided automatic punching apparatus of the type including means for printing on a sheet of material a plurality of printed portions to be punched, and a plurality of positioning marks near the printed portions, the printed portions and the marks being arrayed in a plurality of rows; clamping means for clamping the printed sheet; means for moving the clamping means in X and Y directions of rectangular coordinates of a table; a visual sensor provided for a press machine for detecting center positions of the marks; and means for positioning the printed portions on the press machine for punching the printed portions, characterized by comprising sucking means for sucking the sheet on said table; means for obliquely moving the sucking means for a predetermined distance with respect to the clamping means; and stop means engaged by an edge of the sheet moved by the moving means for correcting an attitude of the sheet, the sucking means causing adjacent edges of the sheets to abut against the stop means and the clamping means for positioning the sheets.

BRIEF DESCRIPTION OF THE DRAWING

In the accompanying drawings:

FIGS. 10a through 10i are timing charts for explaining the operation of various circuit elements shown in FIG. 9;

FIGS. 11 and 12 are flow charts showing a portion of the control to be executed by a CPU for detecting the center position of a mark;

FIGS. 13a–13d show one example of the steps of supplying a sheet of material;

FIG. 20 shows one example of a pneumatic circuit for operating cylinders of the suck transfer mechanism or the like;

FIGS. 37, 38, 39, 42 and 43 show flow charts useful to explain the operation of a CPU utilized in this invention;

FIGS. 42 and 43 are flow charts showing a punching operation;

FIG. 45 shows one example of a NC program utilized in this invention;

DESCRIPTION OF THE PREFERRED EMBODIMENTS

The invention will now be described in detail with reference to the accompanying drawings.

Figure 19:
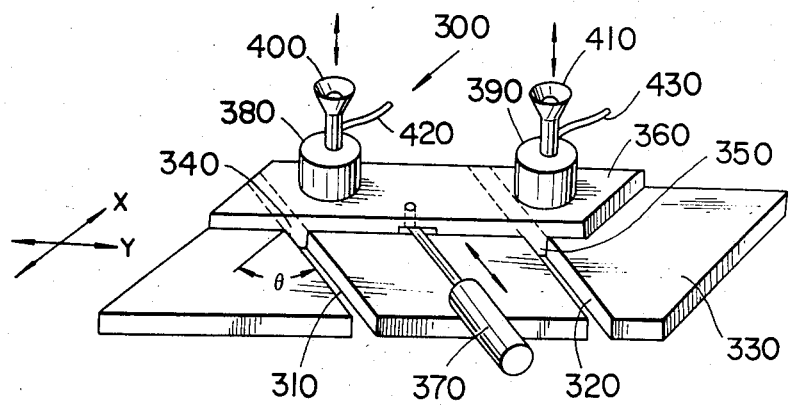
FIG. 19 is a perspective view diagrammatically showing the such transfer mechanism of the material supply device utilized in the automatic punching apparatus according to this invention.

The material supply device utilized in the automatic punching apparatus of this invention utilizes a suck transfer mechanism 300 illustrated in FIG. 19 for positioning a sheet of material to clampers 26. The transfer mechanism 300 comprises a stationary table 330 having two guide grooves 310 and 320 inclined by an angle $\theta$ with respect to direction X, a movable table 360 having projections 340 and 350 which are provided at positions corresponding to grooves 310 and 320 and respectively received therein, a pneumatic cylinder 370 positioned between the grooves 310 and 320 in parallel therewith, pneumatic cylinders 380 and 390 movable on the movable table 369, and vacuum cups 400 and 410 mounted on the top ends of the piston rods of the pneumatic cylinders respectively.

The front end of the piston rod of the pneumatic cylinder 370 is rotatably connected to the movable table 360. The pneumatic cylinders 380 and 390 are positioned with a predetermined spacing in the Y direction and their piston rods are hollow and connected with tubes 420 and 430 for evacuating vacuum cups 400 and 410.

Figure 3:
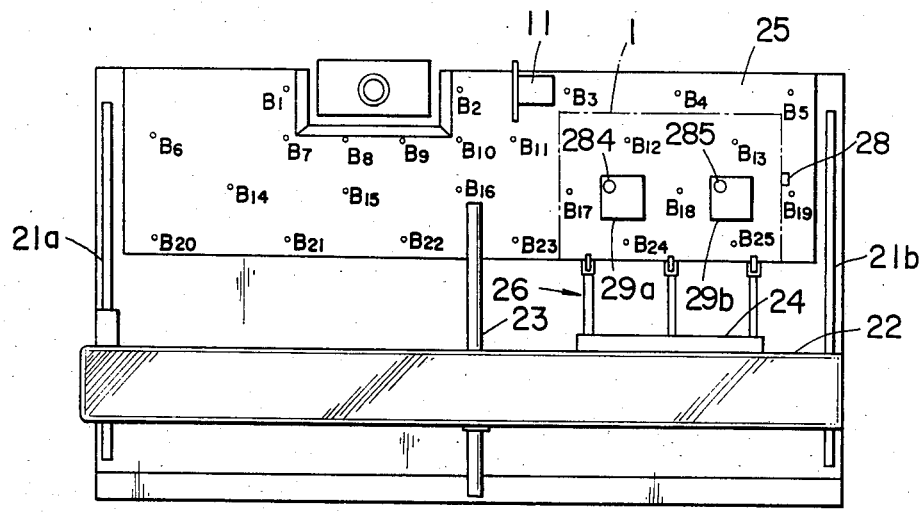
FIG. 3 is a plan view showing the prior art supporting table.
Figure 4:
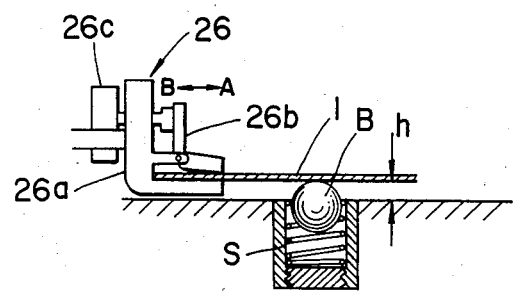
FIG. 4 is a side view showing the construction of a supporting ball and a clamper.
Figure 5:
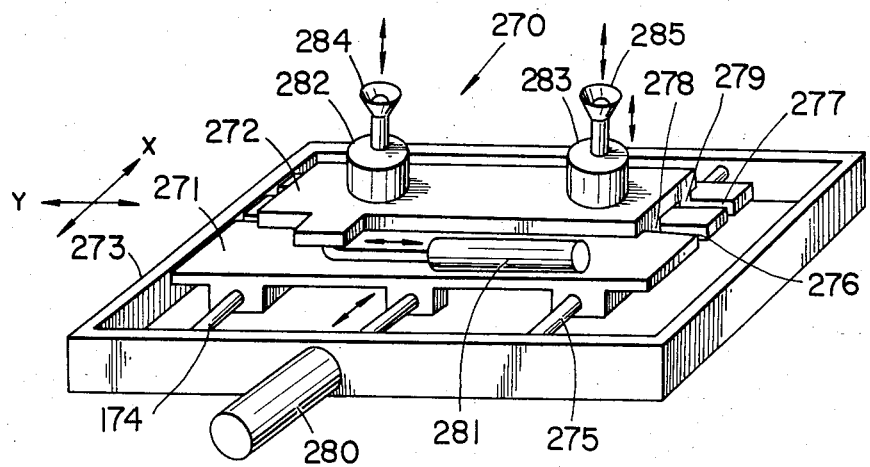
FIG. 5 is a perspective view showing a prior art suction transfer mechanism.
Figure 6:
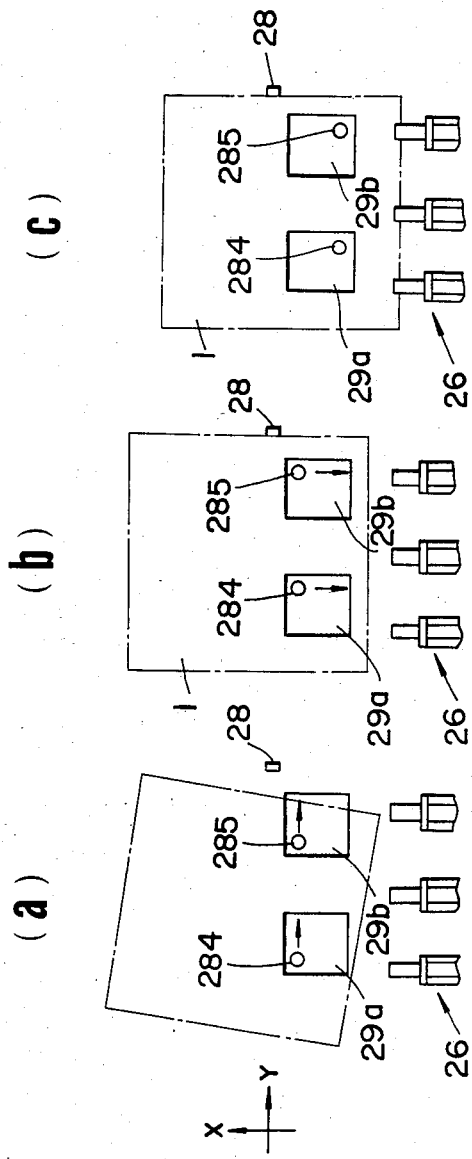
FIG. 6a, 6b and 6c show the steps of positioning a sheet of material with respect to clampers with prior art positioning means.

The material supply device cooperates with the suck transfer mechanism 300, stop member 300 shown in FIG. 3, and clamping pawls 26a and 26b shown in FIG. 4 for positioning the sheet of material 1.

Figure 20:
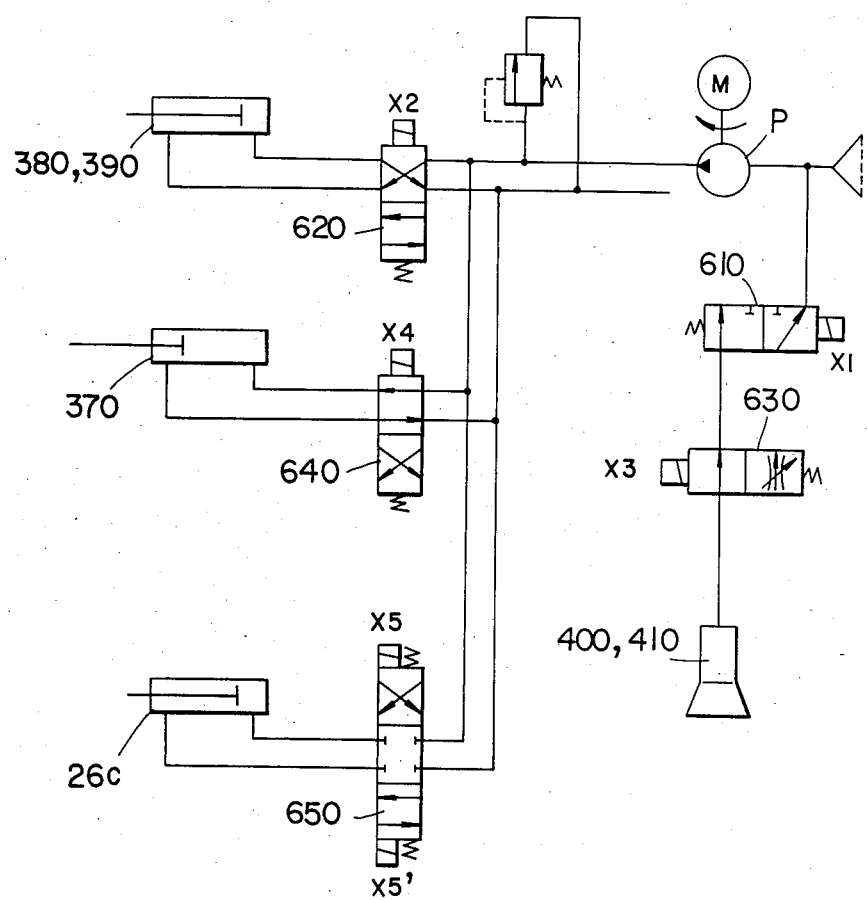
Figure 21:
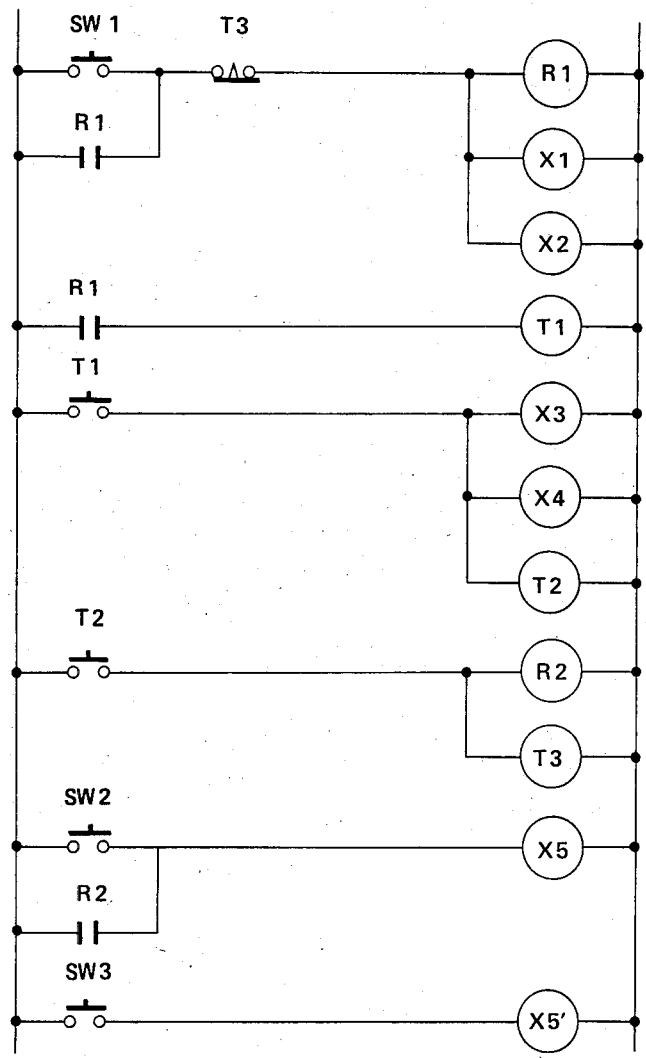
FIG. 21 shows one example of a sequence circuit for controlling the electromagnetic transfer valves shown in FIG. 20.
Figure 22:
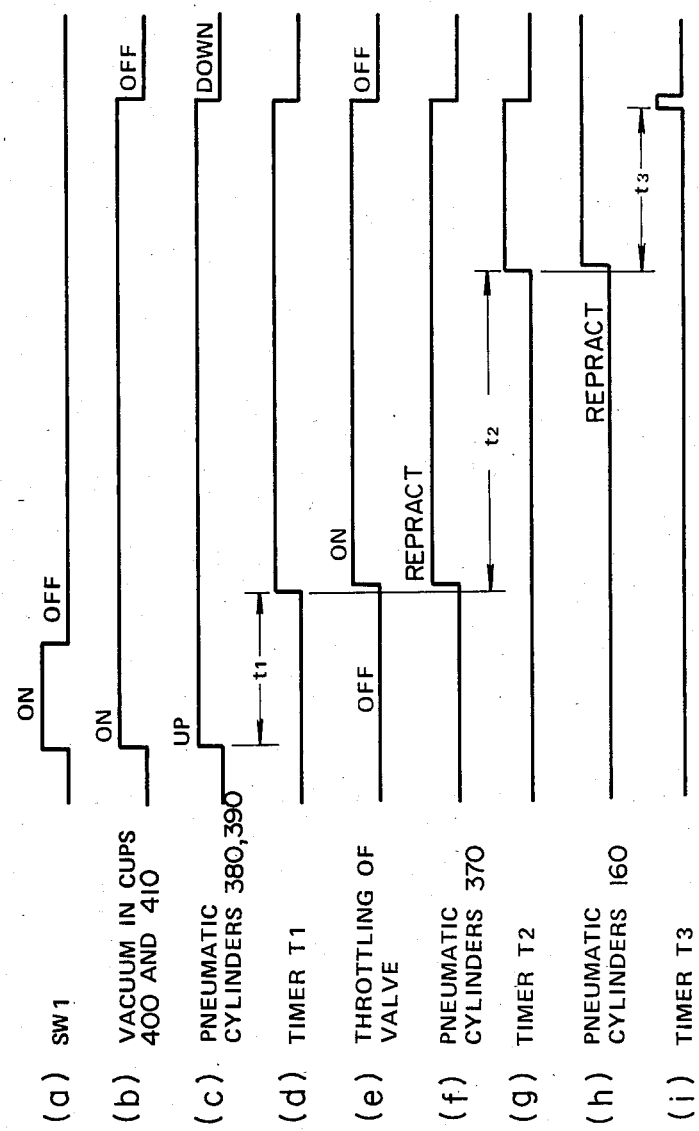
FIG. 22 is a timing chart for explaining the sequence operation effected by the circuit shown in FIG. 21.

FIG. 20 shows one example of a pneumatic circuit for operating pneumatic cylinders 370, 380 and 390, vacuum cups 400 and 410 shown in FIG. 19, and the clamping pneumatic cylinder 360 shown in FIG. 4. FIG. 21 shows one example of a sequence circuit for transfer controlling electromagnetic valves 610–650 of the pneumatic circuit shown in FIG. 19, while FIG. 22 shows a timing chart for explaining the operation of the sequence circuit.

Figure 23:
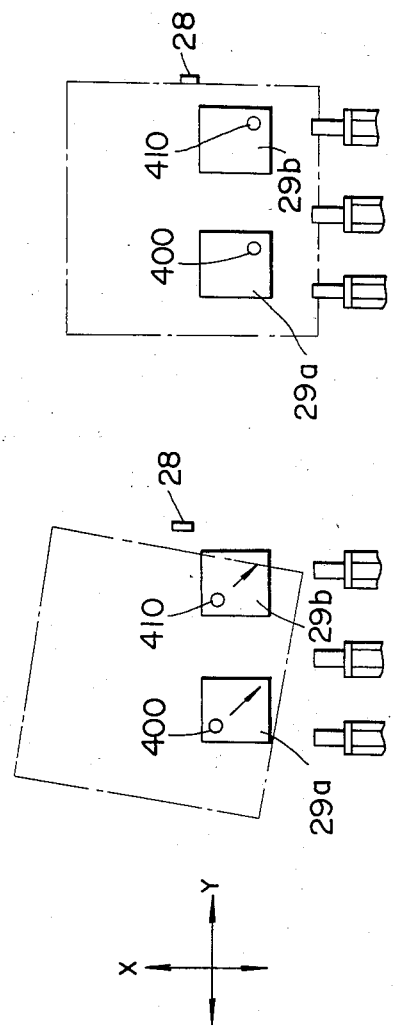
FIGS. 23a and 23b are diagrammatic representations showing one example of positioning the sheet of material with respect to clampers.

Suppose now that the sheet 1 is mounted on table 25 in a manner as shown in FIG. 23a by transfer means not shown. Under this condition, when a push button switch SW1 is closed (see FIG. 22a), a relay R1 self-holds through its own contact so that coils X1 and X2 of electromagnetic valves 610 and 620 are energized, whereby these valves are transfer operated. Consequently, the negative pressure created by a pump P shown in FIG. 20 is applied to the vacuum cups 400 and 410 so as to raise vacuum cups 400 and 410. Thus, as the cylinder 380 and 390 raise vacuum cups 400 and 410 (see FIGS. 23b and 23c) the vacuum cups 400 and 410 reach the lower surface of the sheet of material 1 through window 29a and 29b of the table 25 to suck the sheet 1.

A timer T1 shown in FIG. 21 is of the on-ready type started by the operation of relay R1 and set with a time t1 necessary to raise the vacuum cups 400 and 410, that is to cause them to raise them for sucking the sheet 1. When the timer time b1 of this timer T1 is over as shown by FIG. 22d, the contact of the timer is closed to energize the solenoid coils X3 and X4 of the electromagnetic transfer valves 630 and 640 are energized to transfer them and to energize a second on-delay timer T2. As a consequence, the suction force applied to the sheet 1 by vacuum cups 400 and 410 is reduced by the throttling action of valve 630, and the piston of the pneumatic cylinder 370 shown in FIG. 19 is retracted to pull the movable table 360.

Figure 17:
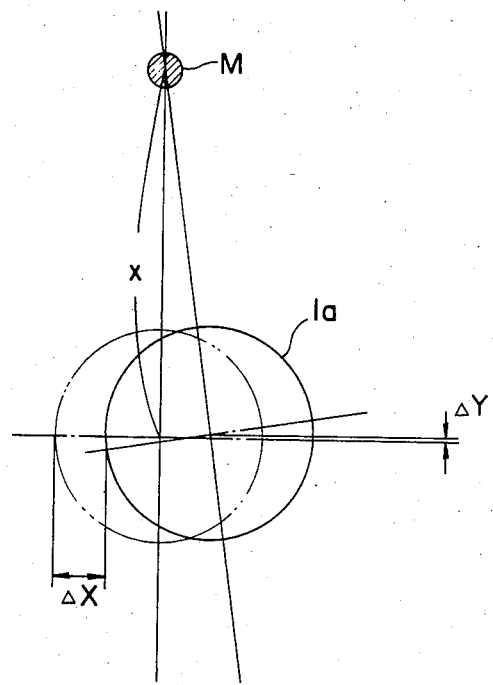
Figure 18:
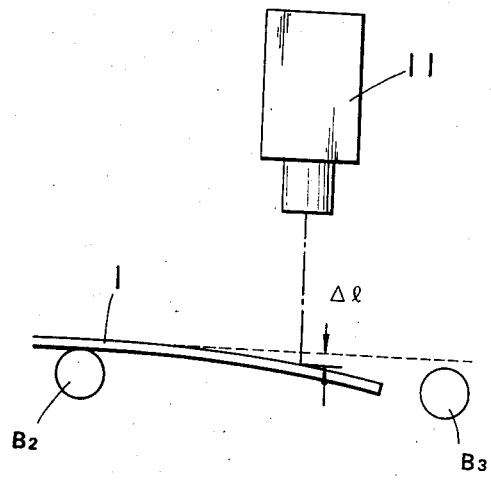
FIG. 18 is a side view showing a problem encountered with a prior art supporting table.

In this embodiment, the grooves 310 and 320 shown in FIG. 19 are inclined by $\theta=45°$ with reference to X direction so that when cylinder 370 is actuated, the vacuum cups 400 and 410 are moved in windows 29a and 29b shown in FIG. 17 in the direction of arrows together with the table 360.

The timer T2 is set with a time t2 in which the piston of the cylinder is operated to its stroke end, and while the timer T2 counts this time, the front and rear edges of the sheet 1 are caused to engage the bases of the clamping pawls 26a (see FIG. 4) and the stop member 28 respectively, whereby the attitude of the sheet 1 is corrected and the sheet is positioned at a predetermined position as shown in FIG. 23b.

After the sheet 1 has engaged with the clamping pawls and the stop member 28, the vacuum cups 400 and 410 slide along the lower surface of the sheet 1 until the piston of the cylinder 370 reaches its stroke end. Because the suction force of the vacuum cups 400 and 410 is decreased by the throttling action of the valve 630. Of course, where the sheet 1 is thick, it is possible to slide the vacuum cups along the lower surface of the sheet 1 without reducing the suction force.

As the piston of the cylinder 370 reaches its stroke end, that is the time t2 of time T2 is over, the contact thereof is closed, a relay R2 is energized and a third on-delay timer T3 is started. Consequently the solenoid coil X5 of the electromagnetic transfer valve 650 is energized so that the piston of the clamping cylinder 26C is advanced thus clamping the sheet 1 between clamping pawls 26a and 26b as shown in FIG. 4. When the time t3 of the timer T3 at which the piston of the cylinder 26c reaches its stroke end is over (see FIG. 22g), the contact of timer T3 is opened to open the self-holding circuit of relay R1.

Deenergization of this relay R1 deenergizes timers T1–T3 so that electromagnetic transfer valves 610–640 are transferred to their original positions shown in FIG. 20, thus returning the vacuum cups 540 and 550 to the position shown in FIG. 23a and maintaining them at a position beneath the upper surface of the table 25.

At the time, when the timer T3 is deenergized, the electromagnetic transfer valve 650 returns to its neutral position, but pawls 26a and 26b still clamp the sheet 1. To release the clamping operation of these pawls 26a and 26b, a push button switch SW3 shown in FIG. 21 is closed. Then, the solenoid coil X5' of the valve 650 is energized to transfer the same in the opposite direction, with the result that the piston of the cylinder 36C is moved in a direction to release the pawls 26a and 26b.

Although not shown in the drawing, the stop member 28 is provided with a manual adjusting device which sets the stop member at any position in Y direction. The upper end of the stop member 28 is bent toward the sheet 1 so as to prevent the end of the sheet from passing above the stop member.

Although in this embodiment, the vacuum cups 540 and 550 are moved in a direction of $\theta=45°$ with respect to X direction, this direction of movement can be set suitably by the position of mounting the sheet 1 on the table 25 by transfer means. For example, where the ratio of the X direction component and the Y direction component of the moving stroke of sheet is about 1:1 the angle $\theta$ is set to 45°, whereas when the ratio is $\sqrt{3}:1$, $\theta$ is set to 30°.

The material supply device utilized in the automatic punching apparatus of this invention may include only one cylinder for positioning sheet 1 with reference to clampers 22, so that the construction can be simplified and the cost of manufacturing can be reduced than the prior art device. Moreover, at the time of positioning, since the sheet 1 is moved obliquely, forces can be simultaneously applied to the sheet 1 in both X and Y directions, thus obviating inaccurate positioning of the sheet.

Figure 24:
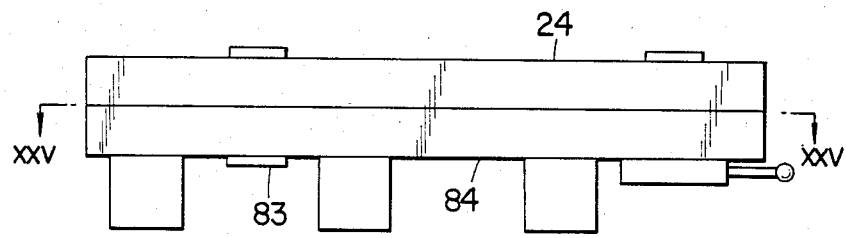
FIG. 24 is a rear side view of the clamping units utilized in the material supply device of the automatic punching apparatus according to this invention.
Figure 25:
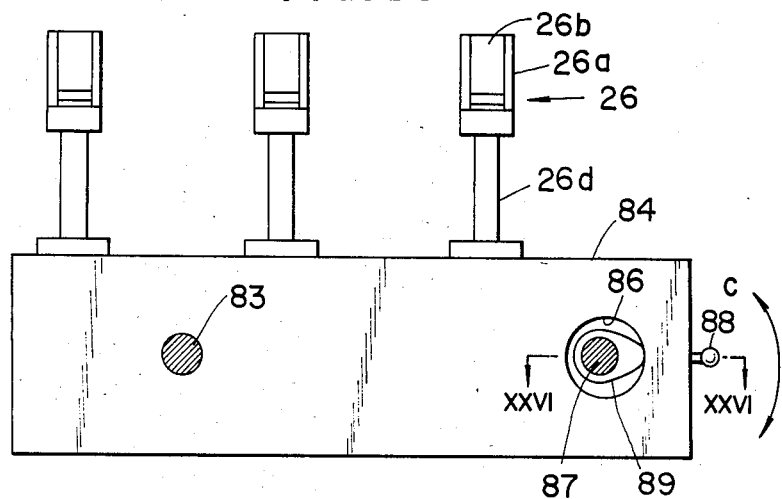
FIG. 25 is a sectional view taken along a line XXV—XXV in FIG. 24.
Figure 26:
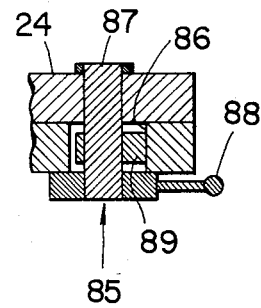
FIG. 26 is a sectional view taken along a line XXVI—XXVI in FIG. 25.

With reference to FIGS. 24, 25 and 26, the clamping unit of the material supply device utilized in the automatic punching apparatus of this invention will be described as follows:

The clamping unit comprises a clamper carrier 24 movable in the X and Y directions of the material supply device, a clamper supporting member 84 rotatably supported by the clamper carrier 24 through a rotary shaft 83, clampers 26 secured to the member 84 for clamping therebetween the sheet 1, and angle correcting means 85 interposed between the clamper carrier 24 and the clamper supporting member 84 for rotating the same.

The clamping supporting member 84 is formed with a cam opening 86 at a position opposing the rotary shaft 83 (see FIG. 25). Each clamper 26 is constituted by an arm 26d and clamping pawls 26a and 26b adapted to clamp therebetween the sheet 1 as shown in FIG. 4.

As shown in FIG. 26, the angle correcting means 85 is constituted by a handle shaft 87 rotatably supported by the clamper carrier 24, a cam 89 in contact with a cam opening 86 of the clamper supporting member 84, and an angle correcting handle 88 secured to the outer end of the rotary shaft 87 for rotating the same. As can be noted from FIGS. 25 and 26, the axis of the handle shaft 87 is eccentric with respect to the center of the cam opening 86.

As a consequence, as the angle correcting handle 88 is rotated in the direction of arrow C or D shown in FIG. 25, the clamper supporting member 84 can be rotated about the axis of the rotary shaft 83 in the same direction of rotation as the angle correction handle 88. Although the range of rotation of the clamper supporting member 84 is limited, since the inclination of the printed portion is abut 7 mm/400 mm, sufficient correction can be made within the range described above.

Figure 14:
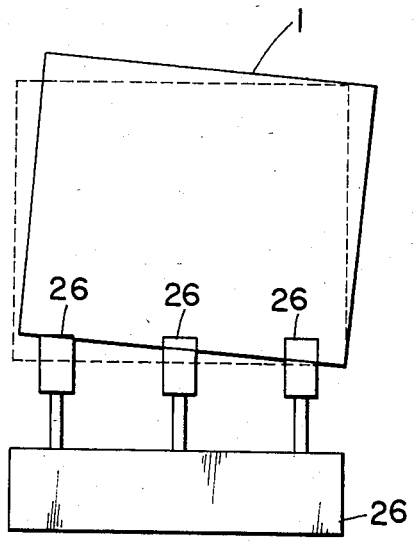
FIG. 14 is a plan view showing inclined state of the sheet of material.
Figure 15:
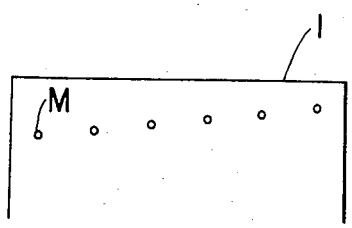
FIG. 15 is a plan view showing a sheet of material with not aligned printings.
Figure 16:
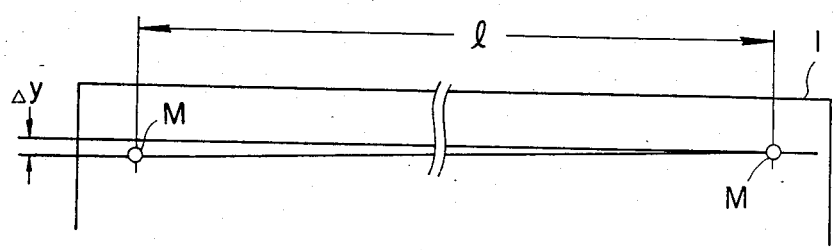
FIGS. 16 and 17 are plan views of the sheet of material for explaining punching error where the material is applied with not aligned printings.

When the clampers 26 clamp the sheet 1 in an inclined state as shown in FIGS. 14 and 15 or the printed portion is printed obliquely with respect to the sheet 1, by adjusting the clamper supporting member 84 the sheet 1 can be supplied to the press machine with the inclination of the printed portion maintained at zero.

Figure 1:
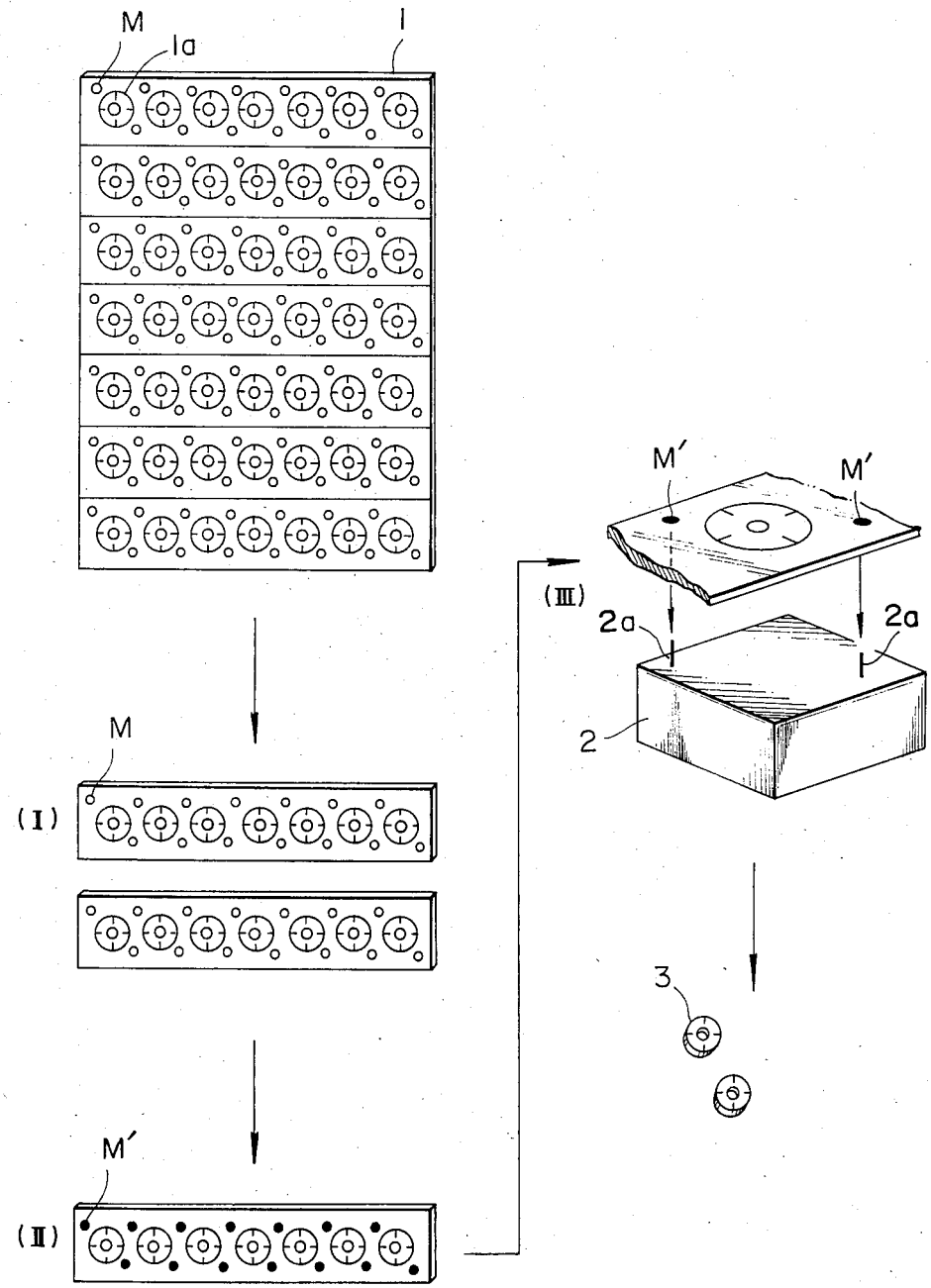
FIG. 1 shows the steps of the prior art method of press punching.
Figure 2:
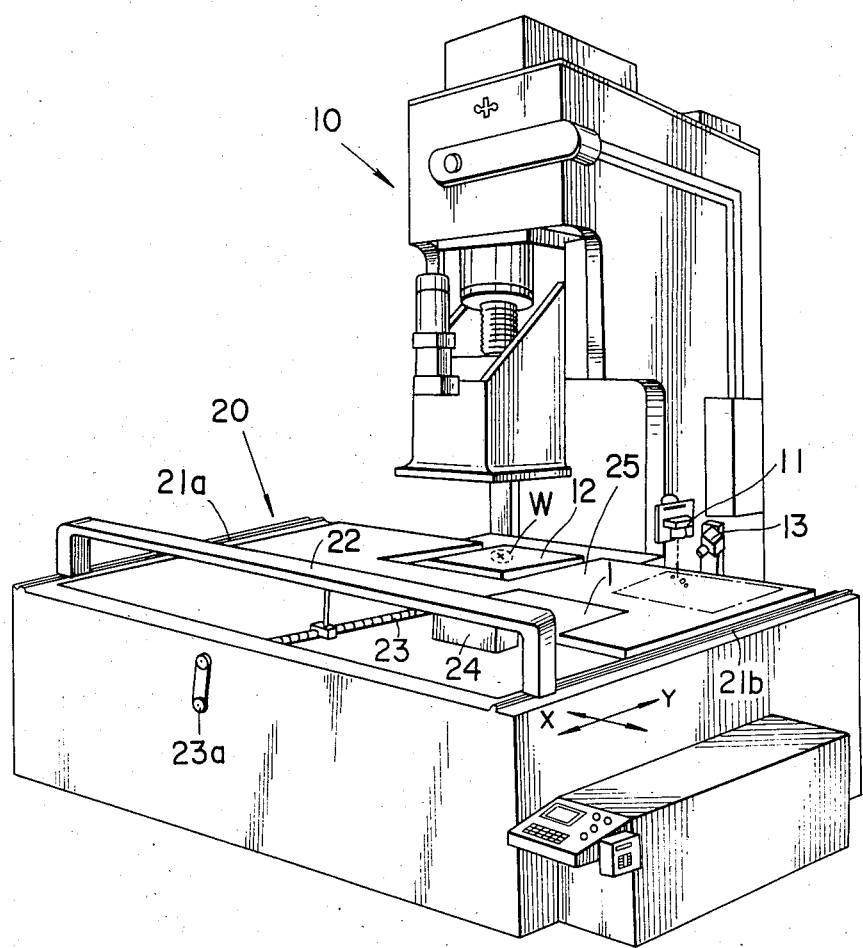
FIG. 2 is a perspective view showing an automatic punching apparatus utilized to carry out the method of this invention.

The method of adjusting the clamper supporting member 84 will be described as follows. According to a first method, the sheet 1 is moved into the field of view of the camera 11 (FIG. 2) and then the sheet 1 is moved in X direction. During this movement, the angle correcting handle 88 is rotated such that the picture image caught by the camera is monitored to cause the mark to appear at substantially the same position on the monitor screen. Of course, at the time of angle correction, the center position of the mark would not be detected.

Figure 27:
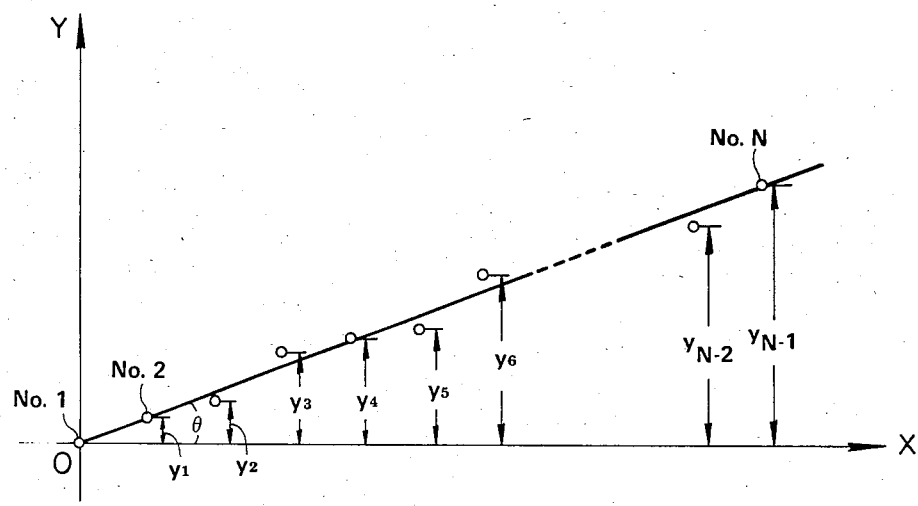
FIG. 27 is a graph suitable for explaining inclination of printing portion with respect to the press machine.

According to a second method the inclination of the printed portion is detected by detecting the center positions of the marks of one row. For example, as shown in FIG. 27, the coordinates of the center positions of the marks of one row are detected, the first mark is taken as a reference, the Y coordinates Y1, Y2 ... $Y_{n-1}$ of the second to Nth marks from reference mark is determined and then the sum S of these coordinates is calculated as follows:

$$S = Y_1 + Y_2 + Y_3 \ldots + Y_{n-1} \quad (6)$$

where all of the coordinates Y1, Y2 ... $Y_{n-1}$ are on a straight line inclined at an angle $\theta$ with respect to the abscissa X the following equation (7) holds.

$$\left. \begin{array}{l} Y_1 = xp\tan\theta \\ Y_2 = 2xp\tan\theta \\ Y_{n-1} = (n-1)xp\tan\theta \end{array} \right\} \quad (7)$$

where xp represents the pitch in X direction.

The sum of the right side and the left side terms of equation (7) is represented by $$Y_1 + Y_2 + \ldots Y_{n-1} = \{1 + 2 + \ldots (n-1)\}xp\tan\theta \quad (8)$$
$$= \frac{n(n-1)}{2} xp\tan\theta$$

The angle $\theta$ can be obtained as follows from equations (6) and (8)

$$\tan\theta = \frac{2S}{n(n-1)xp} \quad (9)$$

$$\therefore \theta = \tan^{-1}\left(\frac{2S}{n(n-1)xp}\right)$$

Actually, S contains error caused by the difference in respective marks in the value of angle $\theta$ calculated by equation (10) so that the difference in respective marks is averaged.

The clamper supporting member 84 is rotated by angle $\theta$ thus detected. In this case, the angle correcting handle 88 may be rotated manually by an angle corresponding to the detected angle $\theta$. It is also possible to use a position servo-mechanism for automatically rotating the clamper supporting member 84 by the detected angle $\theta$.

It should be understood that the angle correcting means is not limited to cam 89 and cam opening 86 shown in the embodiment and that any correcting means capable of rotating the clamper supporting member 84 can be used.

With this clamping unit, even the clampers clamps the sheet 1 in an inclined state, or when the printed portion is inclined with reference to the sheet 1, by adjusting the angle of the clamper supporting member it is possible to make zero the inclination of the printed portion with respect to the press machine, thus ensuring highly accurate punching.

The focal point adjusting device of the visual sensor utilized in the automatic punching apparatus will now be described.

Figure 28:
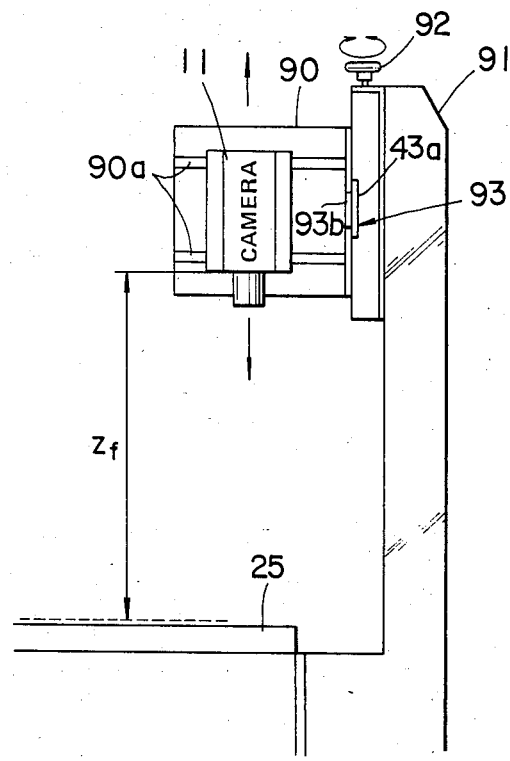
FIG. 28 is a side view showing one example of a focal point adjusting device of a visual sensor utilized in the automatic punching apparatus embodying the invention.

As shown in FIG. 28, this device is constituted by a camera table 96 to which a visual sensor in the form of a camera 11 is secured, a post 91, an adjusting handle 92 and a scale 93.

The adjusting handle 92 is rotatably supported by the post 91 and provided with threads, not shown, making with a nut, not shown, provided for the camera table 90 to which the camera is secured. The camera 11 is slidable along a groove 90a of the camera table go so that it can be fixed at any desired position.

Consequently, as the adjusting handle 92 is rotated, the camera table 90 is slid in the vertical direction along the post 91, thus changing the position of the camera with respect to the supporting table 25.

Figure 29:
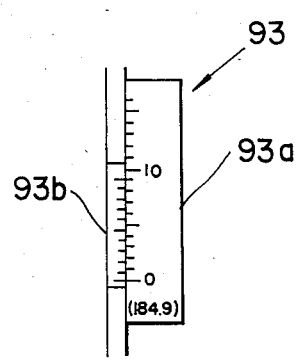
FIG. 29 is an enlarged view of the scale shown in FIG. 28.

A scale 93 for reading the distance of movement of the camera table 90 is provided between it and the post 91. As shown in FIG. 29, the scale 93 comprises a main scale 93a secured to the post 90 and an auxiliary scale 93b secured to the camera table 93b.

When the resolution of the camera 11 is made to be 0.025 mm on the surface of the supporting table 25, in other words, when 0.025 mm is made to correspond to one bit of the image sensor (not shown) of the camera 11, the multiplying factor of the photographed image is inherently determined, and the distance $Z_f$ between the front end of the camera and an object to be photographed is also determined as shown in FIG. 28.

Thus, where a 50 mm F4 microlense and a certain type of an image sensor is used, in order to make 0.025 mm on the surface of the support table 25 to correspond to one bit of the image sensor, the distance $Z_f$ is equal to 184.9 mm. Under these conditions, the depth of the field of view that does not blur the picture image is only ±0.6 mm.

Figure 30:
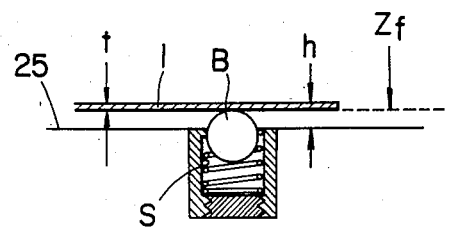
FIG. 30 is a sectional view of the supporting table shown in FIG. 2.

When the distance between the front end of the camera and the surface of the supporting table 25 is equal to 184.9 mm, when the position of the scale is set such that the scale 93 displays O, the distance 184.9 mm is written close to the O scale of the main scale 93a (see FIG. 29). As shown in FIG. 30, supporting balls B are embedded in the supporting table 25 at a suitable pitch so that the sheet 1 can smoothly slide on the balls B. Each ball B is biased by a spring S to project above the surface of the supporting table by a predetermied height. As a consequence, a phantom plane shown by dotted lines formed by the upper ends of respective balls B can be considered as the supporting table surface.

The method of adjusting the focal point is as follows. More particularly. to photograph a sheet 1 having a thickness t as shown in FIG. 30, the adjusting handle 92 is rotated to cause the scale 93 to display t. Where t=1.2 mm, for example, by rotating the adjusting handle 92 to cause the scale 93 to display 1.2 mm the distance $Z_f$ between the front end of the camera and the surface of the sheet 1 becomes just equal to $Z_f$=184.9 mm.

It will be clear that the scale 93 is not limited to the illustrated example, and where it is is not necessary to read the distance in 0.1 mm unit, instead of providing the auxiliary scale, lines or marks showing the reading positions of the main scale may be provided.

Since the focal point adjusting device of the visual sensor has an extremely simple construction, its cost is much lower than a automatic focal point adjusting device and the focusing can be made with a simple adjusting handle so that this adjusting device is especially suitable for a case wherein sheets having different thickness are frequently used.

Figure 31:
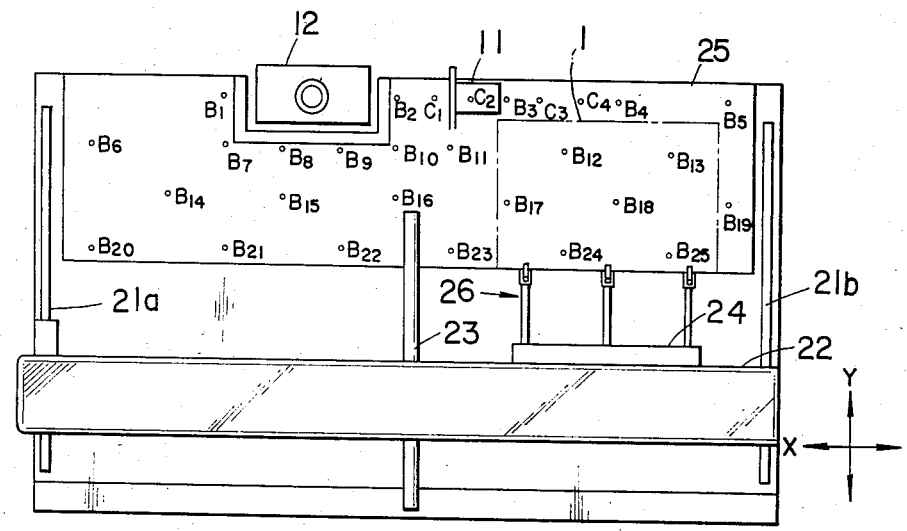
FIGS. 31 and 34 are plan views showing the supporting table of the material supply device utilized in the automatic punching apparatus embodying the invention.

The supporting table of the material supply device utilized in the automatic punching appratus will now be described. In the supporting table shown in FIG. 31, four supporting balls C1–C4 are added to the prior art supporting table shown in FIG. 3. As shown in FIG. 31, ball C2 is embedded just beneath the optical axis of the camera 11, whereas balls C1, C3 and C3 are embedded along a straight line in X direction including ball C2, that is embedded along the direction of feeding the sheet 1 at the time of detecting the center positions of the marks. Balls B2, B3 and B4 are also embedded along the same straight line. As a consequence, it is possible to prevent the sheet 1 from drooping or deflecting downwardly immediately beneath camera 11.

Figure 32:
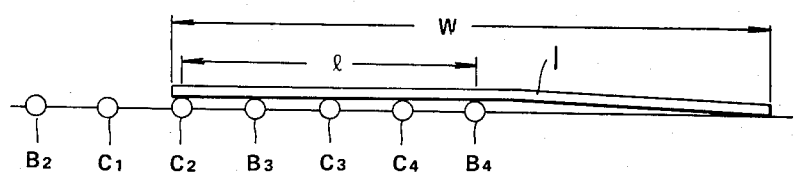
FIG. 32 is a side view showing a portion of the supporting plate shown in FIG. 31.

Furthermore, as shown in FIG. 32, the distance l between balls C2 and C4 is larger than W/2 of the sheet 1 having the maximum width W, floating of the sheet 1 on ball C2 just below the camera 11 can be prevented by the balance of weights on both sides of ball B4. Where distance l is smaller than W/2 it is necessary to embed an additional supporting ball to the right of ball B4. The same consideration is also necessary on the lefthand side of ball C2, but in this embodiment, since the press machine has a lower mold 12 in a range of larger than W/2, the sheet does not deflect downwardly so that there is the fear of floating of the sheet 1 at the position of ball C2 can be prevented by the balance of the weights.

Figure 33:
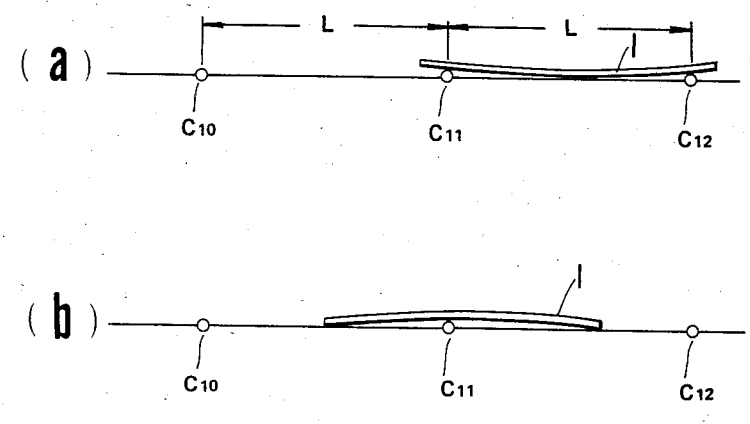
FIGS. 33a and 33b are side views showing other arrangements of supporting balls.

FIG. 33a and 33b show another example of the arrangement of the supporting balls wherein a supporting ball C11 is embedded just beneath the optical axis of camera 11, and the distance L between supporting balls C10 and C12 on the opposite sides of the ball C11 is made to be larger than W/2. With this construction the drooping of the sheet 1 can be prevented by ball C11. In addition, there is no fear of floating up of the sheet 1 at this position caused by the weight unbalance.

With this ball arrangement, however, the sheet 1 largely droops as shown in FIG. 33a and as shown in FIG. 33b, there is a fear that the opposite ends of the sheets 1 may contact with the surface of the supporting table. Furthermore, there is a tendency that the sheet 11 is caused to vibrate due to deflection which occurs when the sheet is supplied, which makes blur the picture image.

For this reason, previously described example is preferred in which the sheet 1 is fed in the horizontal state near ball C2.

Figure 34:
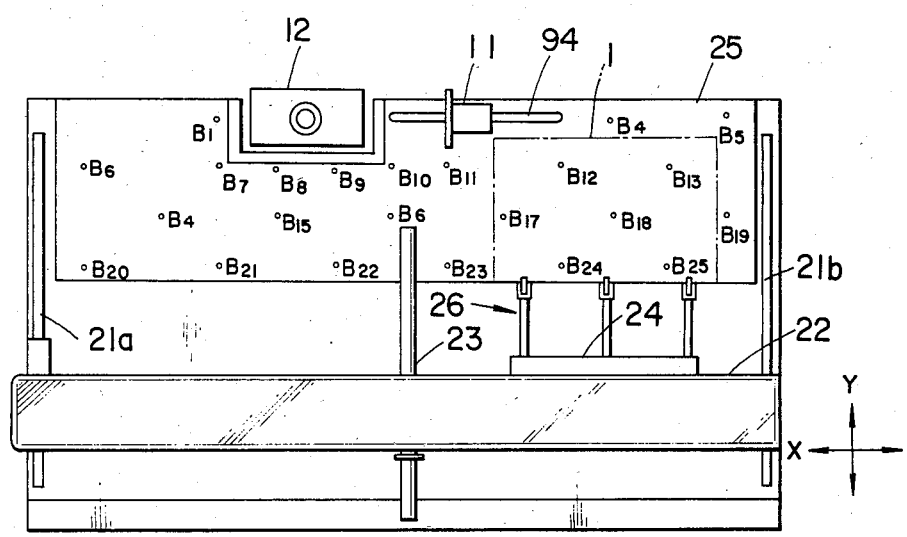

FIG. 34 shows another example of the supporting table, in which instead of increasing the number of the supporting balls, an elongated supporting plate 94 is provided extending in the X direction of the supporting table 25 at a position just beneath the optical axis of the camera 11. This construction prevents drooping of the sheets immediately beneath camera 11.

The supporting plate 94 is fixed to the table 25 so that it would not moved in the vertical direction by a pressure exceeding a predetermined value as in the supporting ball B. For this reason, supporting plate 94 can not be disposed at a position through which the clamping pawls 26a of clampers 26 passe. In order to increase the positioning accuracy, it is desirable to install camera 11 at a position closest to the working position of the press that is a position at which the amount of feed of the sheet in the X and Y directions is minimum when the sheet is positioned at the working position. The direction in the Y direction is preferable to be substantially the same as the punching position. The clamping pawls 26a of the clamper 26 are not required to pass such point so that the supporting plate does not interfere with the clamping pawls.

Figure 35:
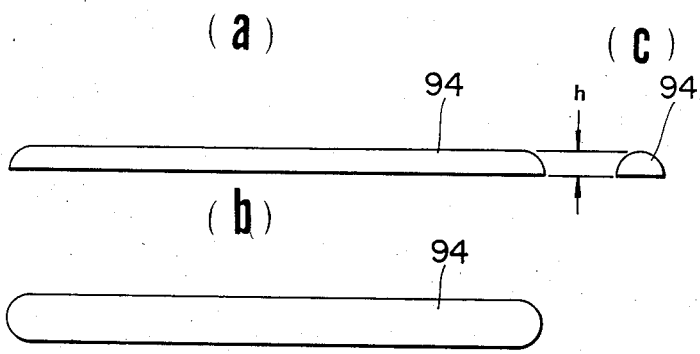
FIGS. 35a, 35b are front view are plan view of the supporting plate shown in FIG. 36.
Figure 36:
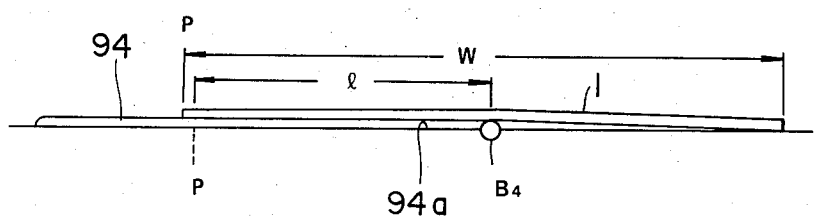
FIG. 36 is a side view of the supporting plate.

The detail of the supporting plate 94 is as follows. As shown in FIGS. 35a, 35b and 35c, the upper surface of the supporting plate 94 is flat and its height is the same as the projecting height h (FIG. 30) of the supporting ball B. The cross-sectional configuration is semicircular and its both ends are smoothly curved.

The supporting plate 94 is made of wear resistant material having a small slip resistance, such as nylon, teflon, etc. The cross-sectional configuration of the supporting plate may be semi-elliptical, frustum or triangular.

When the supporting plate 94 has a length such that the distance l between a point P just beneath the camera 11 and ball B4 is larger than W/2 of a sheet 1 having a maximum width W, the weights on both sides of ball B4 balance with each other, thus preventing floating up of the sheet 1 at point P just beneath camera 11. On the otherhand, when the distance l is smaller than W/2, it is necessary to elongate the supporting plate 94 to the right of ball B4. Even when the distance l is larger than W/2, should the sheet 1 deflects between one end 94a of the supporting plate 94 and ball B4 the sheet 1 would float up at the point P just below camera 11 to prevent this, it is necessary to make sufficiently long the supporting plate 94. On the lefthand side of point P the same consideration is necessary but in the illustrated embodiment, since there is provided a lower mold for the press machine, within the range of W/2 the sheet does not flex so that the sheet 1 does not float up at point P just below the camera 11.

A method of discriminating defective printed portion and the normal printed portion of the sheet 1 and a method of checking whether the visual operates normally or not will be described.

FIG. 37 is a flow chart for describing the steps of this method. At step 100, marks of the first row are detected. At step 101, a judgment is made as to whether the number of marks $N_p$ whose center positions could not be detected continuously is larger than a preset error number $N_D$ or not. When the result is NO, at step 102, sheets of the first row is stamped, but when the result of judgment is YES, at step 108, respective shaft feeds are stopped to make OFF respective outputs, and error is displayed on a cathode ray tube (CRT). A judgment whether the detection of the mark center positions is correct or not will be described later.

Figure 39:
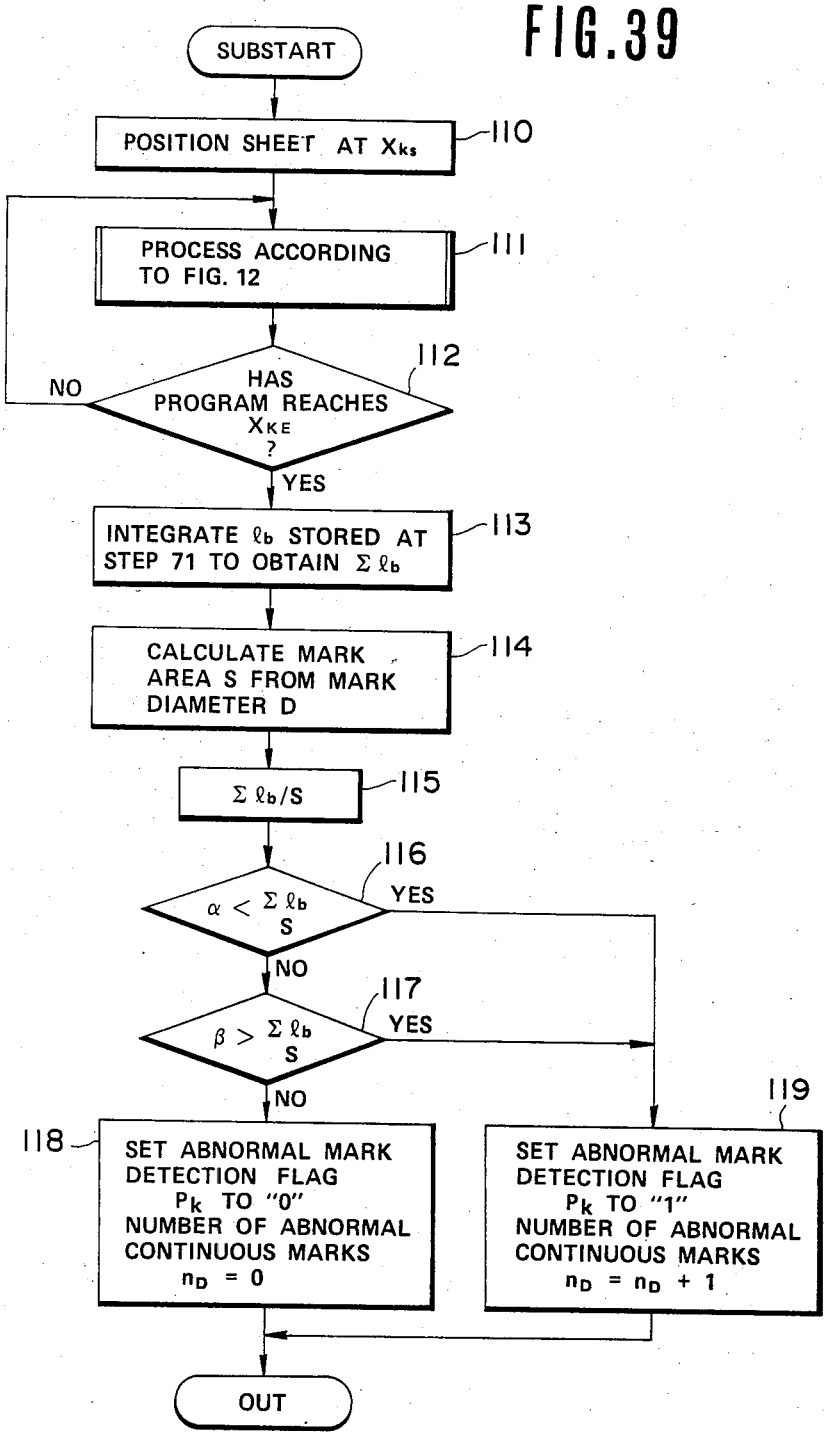

FIG. 38 is a flow chart showing the detail of mark detection of any row, and FIG. 39 is a flow chart showing the detail of detection of a mark of any number K.

Figure 7:
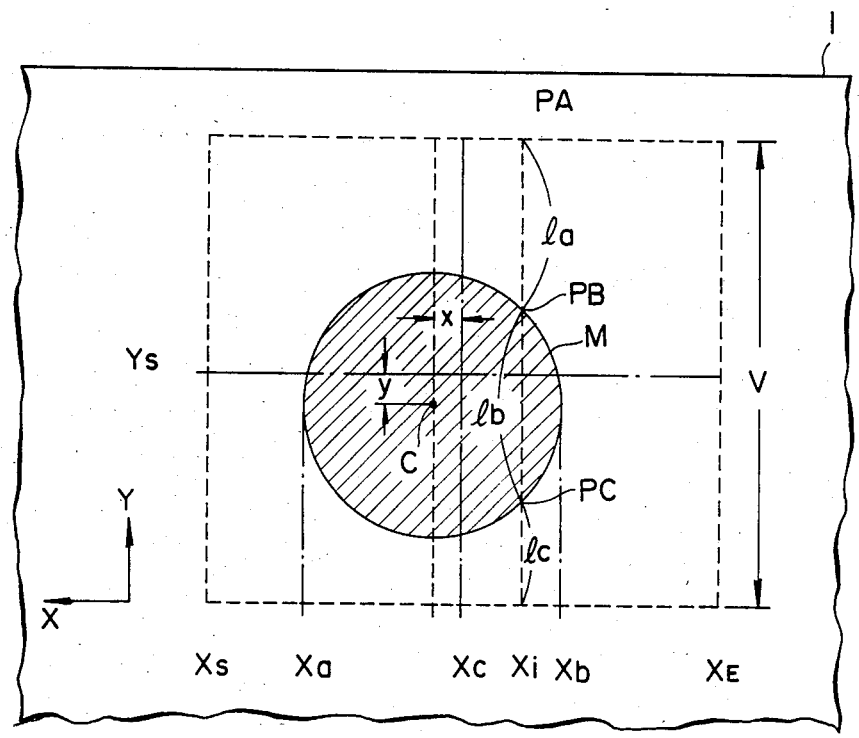
FIG. 7 is plan view showing a portion of the sheet of material near a mark and useful to explain the operation of a visual sensor.

In FIG. 39, at step 110, the sheet is positioned at the position XKS of the Kth mark position. XKS means the position XS of the Kth mark (see FIG. 7). At step 111, the processing shown in FIG. 12 is executed. After that, a judgment is made as to whether the program has reached a subscanning completion position XKE or not, when XKE means the position XE of Kth mark (see FIG. 7).

Upon completion of all scannings, at step 113, the valve (the length across the mark) of lh stored at step 71 shown in FIG. 12 is integrated, and the integrated value is temporarily stored as the area $Z_{lh}$ of the detected mark.

At step 114, a mark area $S(=\pi D^2/4)$ is calculated from the mark diameter D which has been prestored as a machine data. Alternatively, the actual mark area may be directly stored. At step 115, the ratio between the detected mark area $\Sigma lh$ and the actual mark area S is calculated. At step 116 and 117, judgments are made as to whether the ratio is larger than a preset upper limit $\alpha$ or smaller than a preset lower limit $\beta$.

When the results of judgments at steps 116 and 117 are both NO, it means that the mark has been detected normally. In this case, an at step 118, abnormal mark detection flag $P_K$ is cleared to 0 while at the same time the number $n_p$ of abnormal detections of continuous marks is also cleared to zero. On the other hand, where either one of the judgments executed at steps 116 and 117 is YES, it means that the mark was not detected normally. In this case, at step 119, the flag $P_K$ is set to 1 and $n_p$ is incremented by one.

Figure 40:
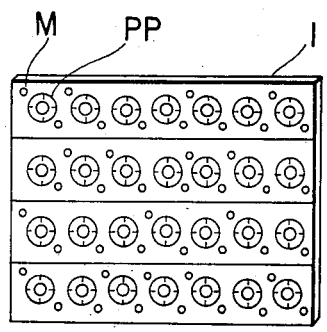
FIG. 40 is a plan view showing one example of a sheet of material utilized to carry out the method of this invention.

Prior to the punching operation the printed sheet 1 is checked with the eyes of an operator, and marks corresponding to printing portions including unsatisfactory printing and defects are masked by costing black paint as shown in FIG. 40.

Figure 41:
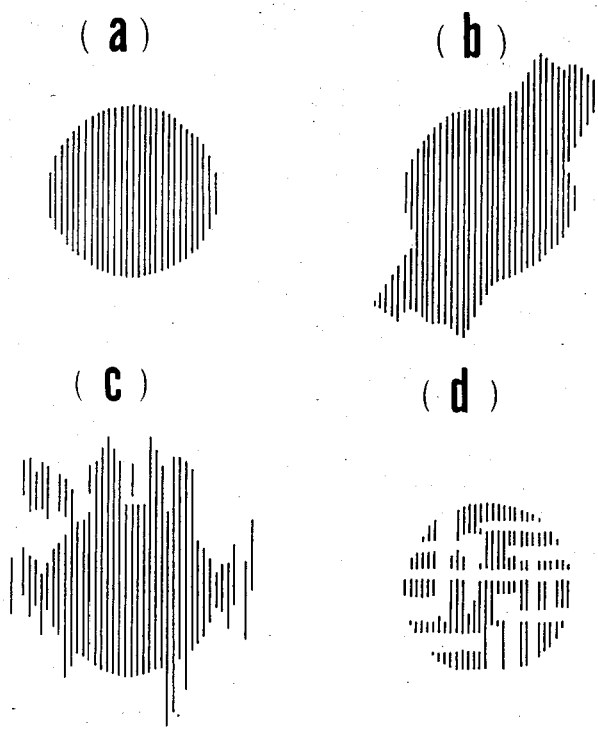
FIGS. 41a–41d show examples of picture images near a mark caught by a visual sensor.

Considering a case wherein the visual detecting means operates normally, a not masked mark M produces a picture image as shown in FIG. 41a, whereas a masked mark M produces a picture image as shown in FIG. 41b. In the case shown in FIG. 41a, by the processing executed at step 118, the abnormal mark detection flag $P_K$ is reset to 0, whereas in the case of FIG. 41b, at step 119 the flag $P_K$ is set to 1. This flag $P_K$ is used to classify satisfactory products and rejects.

Even when the mark M is not masked, a picture image as shown in FIG. 14c would be obtained when the visual means does not operate normally, for example, when the threshold value VTH used to convert picture image data into binary codes, or the intensity of light of a lamp 13 is too large. Conversely, when the threshold value VTH is too high or the lamp 13 (FIG. 2) is too dark, the abnormal mark detection flag $P_K$ is set to 1. This situation, however, is caused by an abnormal operation of the visual means, and the number $n_p$ of detections of continuous marks increases gradually. Upon completion of detection of the marks of a given row, at step 101 shown in FIG. 37, a judgment is made as to whether the number $n_p$ is larger than a predetermined error number $N_p$ or not, and when the result of judgment is YES, at step 108, the error is displayed on a cathode ray tube (CRT), and succeeding operations are stopped.

Other causes that result in continuous abnormal detections are (1) fault of the lamp [breakage of the filament or change in the brightness caused by trouble of the power source (voltage variation or interruption of the source)]

Figure 9:
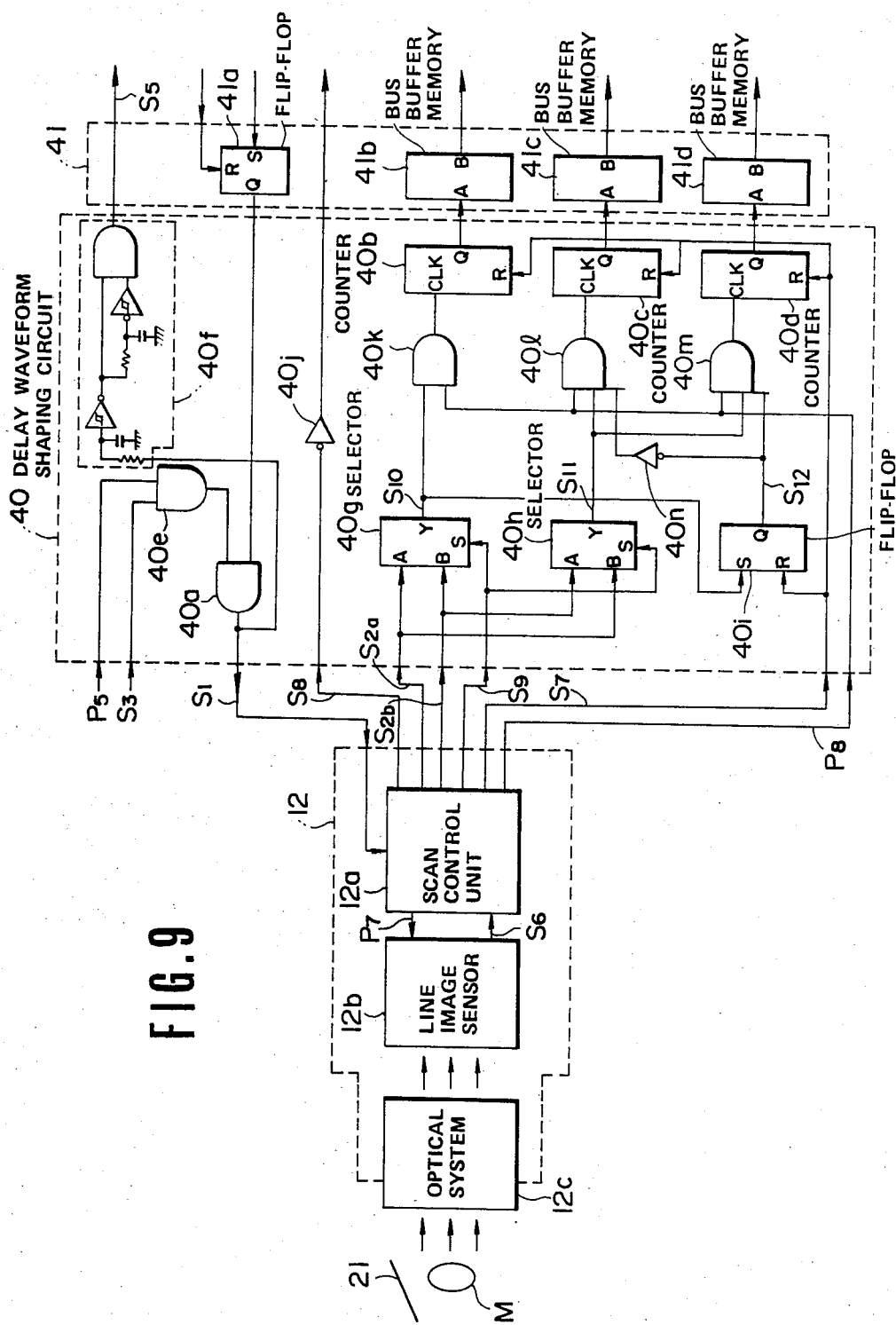
FIG. 9 is a block diagram showing the detail of a portion of the control circuit shown in FIG. 8.

(2) fault of the line image sensor 11b (FIG. 9).

(3) fault of the interface circuit of the line image sensor 11b, (4) spoiling of the lens of the line image sensor 11b, and (5) improper adjustment of the focus of the line image sensor 11b (blurring).

When detections of the marks of a given row is completed, and when the number $n_p$ of continuous abnormal detections is less than a preset error number $N_D$, the punching is made as shown in FIG. 37.

Figure 42:
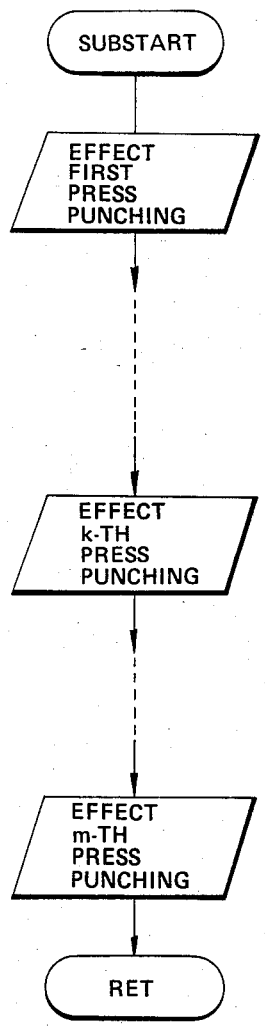
Figure 43:
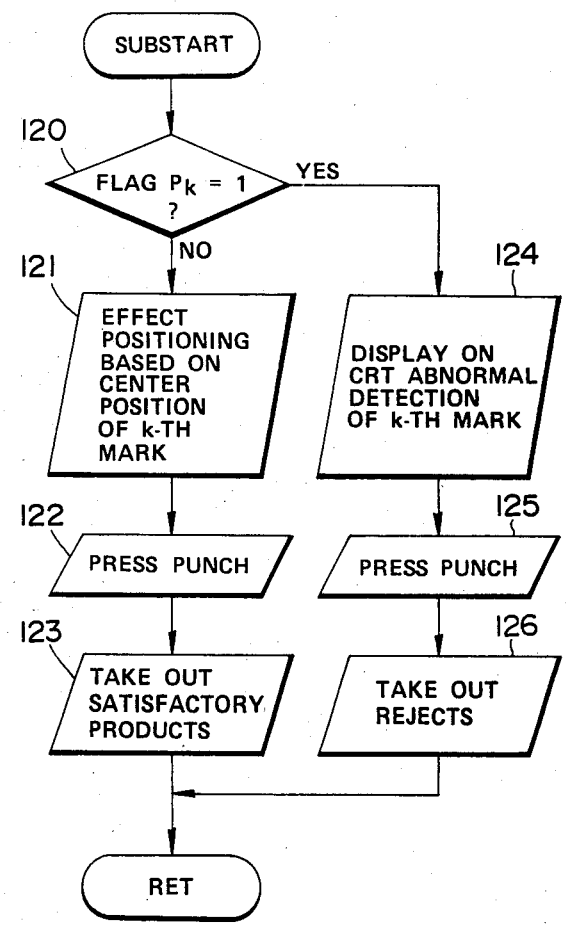

FIG. 42 is a flow chart showing the detail of the press punching of any row of the sheets while FIG. 43 is a flow chart showing the detail of the press punching of an arbitrary number K.

In FIG. 43, at step 120, a judgment is made as to whether the flag $P_K$ of abnormal mark detection executed at steps 118 or 119 shown in FIG. 39 is 1 or not. When the result of judgment is NO, at step 121, positioning of the sheet is made based on the mark center position detected by the processing shown in FIG. 12, and at steps 122 and 123 instruction signals for effecting press punching and taking out satisfactory products are issued. But when the flag $P_K$ is 1, an abnormal detection of the Kth mark is displayed on the CRT at step 124. Then at steps 125 and 126 instruction signals for press punching and taking out of rejects are issured.

Figure 8:
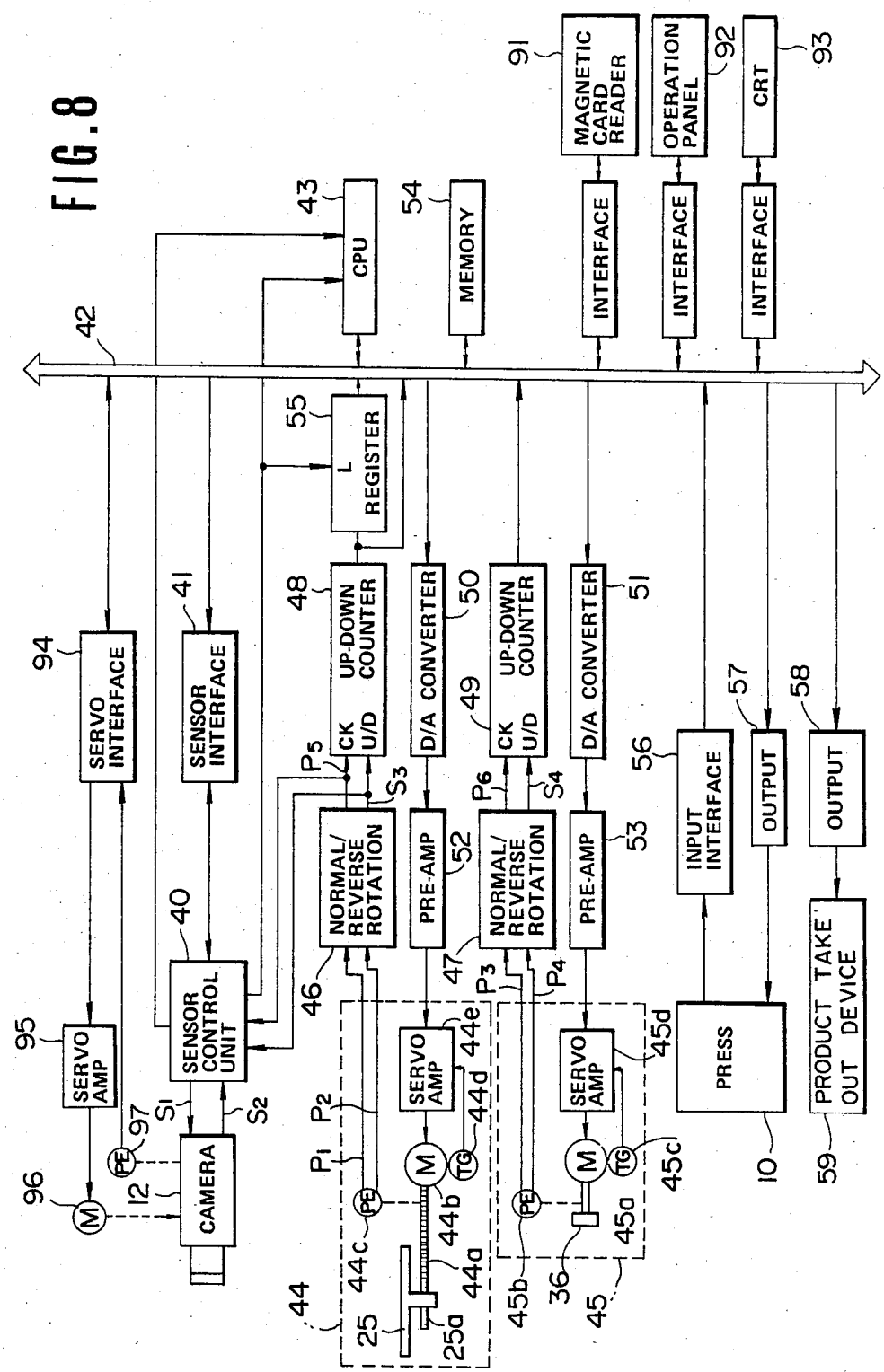
FIG. 8 is a block diagram showing one example of the control circuit of an automatic punching apparatus.

The instruction signals for taking out satisfactory products and rejects are supplied to product take out device 59 from CPU 43 via bus line 42 and output interface 58 as shown in FIG. 8.

Figure 44:
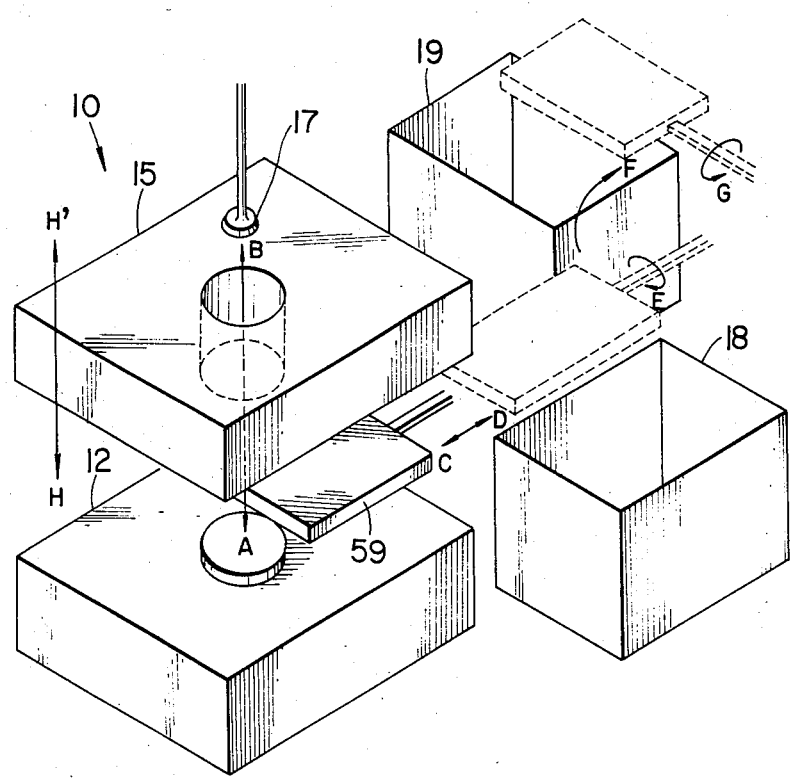
FIG. 44 is a perspective view showing one example of a product take out device utilized in this invention.

FIG. 44 diagrammatically shows the press machine and the product take out device. One press work is completed when a upper mold 15 is receprocated once over a stroke H—H'. A vacuum cup 17 is lowered in the direction of arrow A each time one cycle of press punching is over so as to such the product remaining on the lower die 12 and then the vacuum cup 17 is raised together with the product in the direction of arrow B. Then the product take out device 59 is moved in the direction of C to a position beneath the raised product. Then the vacuum in the vacuum cup 17 is broken to drop the product on the product take out device.

Then the product take out device 17 is retracted in the direction of D. When the flag $P_K$ is not 1, (a case of taking out satisfactory product), the product take out device 59 is rotated in the vertical direction as shown by arrow E to drop the product into a satisfactory product receiver 18. When the flag $P_K$ is 1 (rejects), the product take out device 59 is rotated 90° in the direction of arrow F to drop the rejects into a reject receiver 19.

The method of taking out by using the product take out device 59 and vacuum cup 17 can be readily carried out when these elements are mechanically linked with pneumatic cylinders and valves. Any type of product take out device can be used so long as it can classify satisfactory products and rejects.

In the embodiment described above, irrespective of the quality of the products, press punching is always done and then the products are classified into satisfactory ones and rejects. This method is used because it is necessary to cut off sheet from which the products have been punched with a scrap cutter so that the scrap would not interfere the mark detection, punching of the next sheet. For this reason, where the press machine has a sufficient margin for the feeding of the sheet in Y direction, or the number of rows of the printed portions on the blank sheet is small so that it is not necessary to cut off the sheet at the same time of punching, taking out of rejects (when flag $P_K=1$) may be omitted.

Although, an example wherein abnormal marks are detected by calculating the areas of the marks was described, such detection can be made with other method. For example, an abnormal mark can be detected by measuring its diameter, or by judging the characteristics of the border line of the mark or presence thereof. Such method of judging abnormal marks is in material to this invention.

As above described according to the method of automatic punching of this invention, since abnormal printing portions are erased (masked by coating) and since satisfactory products and rejects are automatically classified after punching or since abnormal printings are not punched, it is not necessary to input positional data of defective printed portions into a data processing unit. Moreover, since whether a visual sensor is normally operating or not is constantly supervized it is possible to prevent errorneous punching caused by abnormality of the sensor.

Finally, a method of minimizing feed quantity (stroke) of a series of sheets will be described with reference to a NC program shown in FIG. 45.

Figure 46A:
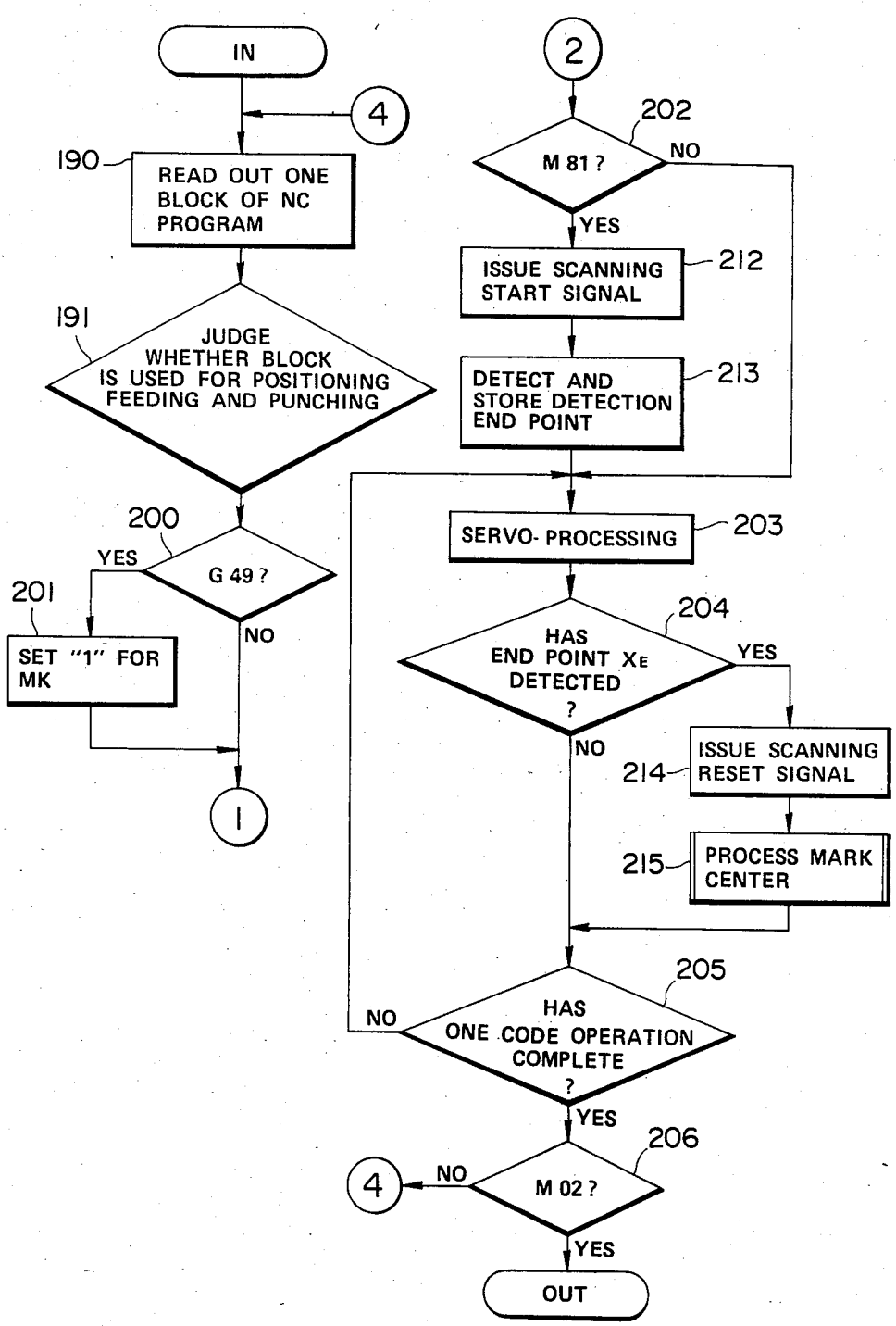
FIGS. 46 and 47 are flow charts for explaining the content of the NC program shown in FIG. 45.
Figure 46B:
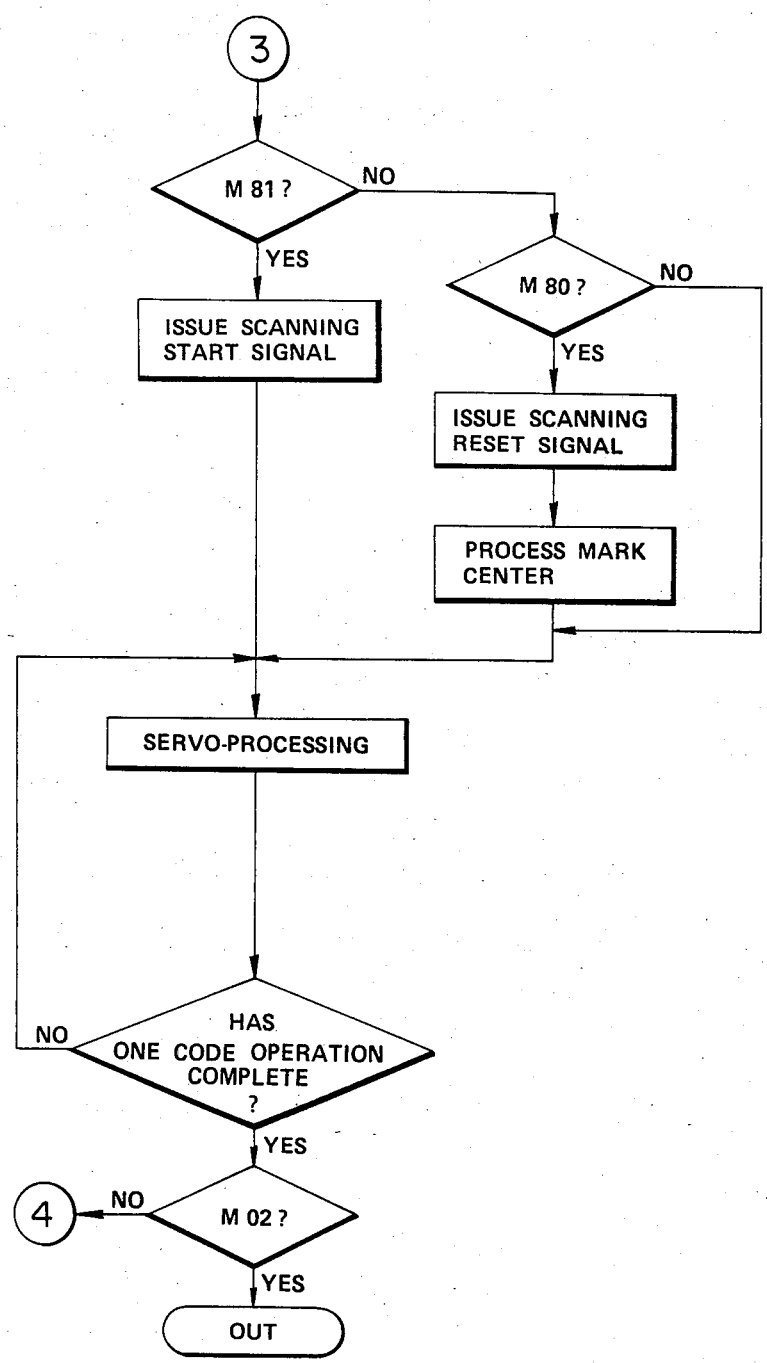
Figure 47:
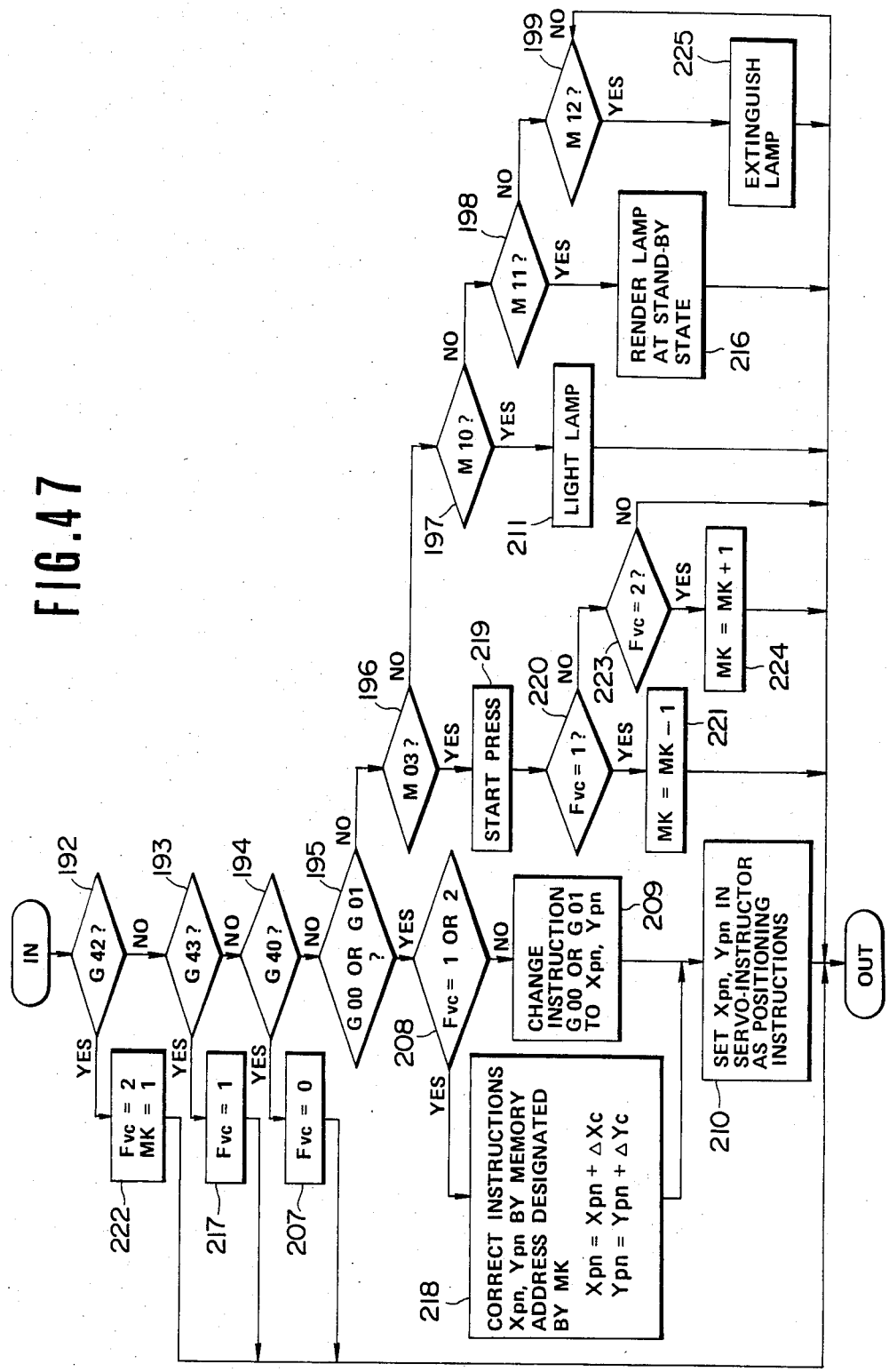

Further, the CPU 43 shown in FIG. 8 executes the processings of various steps shown in the flow charts shown in FIGS. 46 and 47 according to the NC program shown in FIG. 45.

As shown in FIG. 46, at step 190 the content of one code N0001G49 is read out from the NC program. At step 191, a judgment is made as to whether the read out content is an instruction utilized for positioning, feeding and punching or not. As shown in the flow chart shown in FIG. 47, the step 191 comprises steps 192-199 at which inputted instructions are judged. When the step 191 corresponds to either one of the steps 192-199, a corresponding processing is executed, while in other cases, the program is jumped from step 190 to step 200 at which a judgment is made as to whether the read out content is G49 (see FIG. 45) or not. When the result of step 200 is YES at step 201, "1" is set for MK which represents a mark number.

The flow routine proceeds to (3) or (2) shown in FIG. 46 depending upon the manner of preparing the program, that is whether a code [N0035 M80](see FIG. 45) is incorporated into the program or not. Since in both routines (2) and (3) substantially the same processings are executed, in the following the routine (2) not incorporated with the code will be described. Consequently, the program is jumped to step 206 from 202 without executing steps 203, 204 and 205. At step 206, a judgment is made as to whether the program is ended or not. In this case, the result of judgment is NO and the program returns to step 190.

Then at step 190, the content [N005 G40]of the next block of the NC program is read out. Due to this content, the result of judgment executed at step 194 (see FIG. 47),included in step 191 becomes YES. Then at step 207 after setting to FVC to 0, the program returns to the first step 190 after a judging step 206 (see FIG. 46). As will be described later FVC represents a flag showing that whether the direction of feed is forward or reverse at the time of detecting a mark, and at the time of positioning. Where FVC is 0, it corresponds to mark position detection.

Then at step 190, a code [N0010 G00X(XSl) Y(YSl)-]is read out. According to this content, the result of judgment at step 195 becomes YES, and since FVC=0 the result of judgment at step 108 becomes NO. At steps 209 and 210, a code X(XSl)Y(YSl) is set in a servo-instructor as a positioning instruction. This positioning instruction represents (X,Y) coordinates shown in FIG. 7. Then at steps 203, 204 and 205 a servo-operation is executed to move the sheet to the (X,Y) coordinate position, which corresponds to the scanning start position of the first mark. When the sheet is moved to this position, the program returns to the first step via judging steps 205 and 206.

Then, at step 190, a code [N0015 M10]is read out and depending upon the content thereof the result of judgment as step 197 included in step 191 becomes YES. At step 211, lamp 13 (see FIG. 2) is lighted and the program returns to the first step 190 via a judging step 206. Then at step 190, a code [N0020 M81]is read out so that the result of judgment at step 202 becomes YES to issue a scanning start signal at step 212. Then a detection of end point XE (see FIG. 7) is calculated based upon detected area machine data. After storing the calculated end point the program returns to the first step 190 via a judging step 206.

Thereafter, at step 190 a code [N0030 G01 X(XEI)]is read out. Depending upon the content there of the results of judgments at step 195 included in step 191 and at step 208 become YES and NO respectively. At steps 209 and 210 a code X (XEI) is set in a servo-instructor as a positioning instruction. Thus, in steps 203-205, a servo-operation is executed and the processings shown in the flow chart in FIG. 12 are executed. At step 204, when a detection of end point XE is judged, at step 214, a scanning reset signal is issued to store deviations $\Delta XC$ and $\Delta YC$ of X and Y coordinates of the center position of a mark M in a memory address designated by a MK number to increment the same by one. Then the program returns to the first step 190 via judging steps 205 and 206.

In the same manner, by executing codes [N0040 N0060] of the NC program the deviation of the center position of the second mark is stored. Upon completion of the detection of the center positions of the marks of one row, at step 190, a code [N0900 M11] is read out and depending upon the content thereof the result of judgment of step 198 included in step 191 becomes YES. Then of step 216, the operating mode of the lamp 13 is changed to a stand-by mode of which about 30 % of the rated power is supplied to lamp 13 thus saving the power consumption and elongating the life of the lamp. In this mode, the lamp filament is heated by 30 % power, occurrence of rush current at the next lighting can be prevented.

As above described, when the detection of the center positions of the marks of one row is completed the positionings and punchings of the printed portions of that row are executed by either one of the codes [N2010, N2020 . . . ]. The former code is used to reverse the direction of feed of the sheet at the time of positioning the printed portions to be punched with respect to the direction of feed of the sheet at the time of detecting the center position of the mark. Thus, positionings and punchings toward a printed portion corresponding to a mark whose center position has been detected firstly from a printed portion corresponding to a mark of the row whose center position has been detected at the last. The latter code is used to feed the sheet in the forward direction at the time of determining the position of the printed portion to be punched, that is in the same direction as that of feeding the sheet at the time of detecting the center position of the mark. Thus, the positionings and punchings are sequentially performed starting from a printed portion corresponding to a mark whose center position has been firstly detected toward a printed portion corresponding to a mark whose center position has been detected at the last.

A case wherein a program in which the order of positioning and feeding is reversed is selected will be described as follows. At step 190, a code [N1010 G43]is read out, and depending upon the content of thereof the result of judgment at step 193 included in step 191 becomes YES. Then at step 117, after setting the flag FVC to 1 the program returns to the first step 190 via a judging step 206. Then at step 190 a code [N1020 G00 X )(Xpn)T(Tpn)] is read out, and depending upon the content of this code the results of judgments at step 195 included in step 195 and at step 208 become YES and then the program advances to step 218.

At step 218, instructions Xpn and Ypn are corrected as shown by the following equation in accordance with deviations ($\Delta Xc$, $\Delta Yc$) of the center position of a mark stoed in an address of a memory device designated by MK.

$$\left. \begin{array}{l} X_{pn} = X_{pn} + \Delta X_c \\ Y_{pn} = Y_{pn} + \Delta Y_c \end{array} \right\} \quad (11)$$

At this time, MK is incremented at each processing of the center value of a mark until the last mark number 21 is reached.

Assuming that there is no displacement of the clamp and no elongation and contraction of the sheet due to temperature variations, the instruction Xp24, Ypn represent a point at which a printed portion corresponding to the Nth mark would be precisely positioned on the metal mold of the press machine. This point can be predicted by an operator.

Then at step 190, a code [N1030 M03] is read out and in accordance with the content of this code, the result of judgment at step 196 included in the step 191 becomes YES, so that at step 219 the press machine is started. After that, since EVC="1", the result of judgment at step 220 becomes YES and at step 221, after decrementing MK by one the program returns to the first step 190 via a judging step 206. In the same manner, by executing codes (N1040, N1050) of the NC program, positioning and punching of a printing portion relating to the (n−1)th mark are performed. As above described, positioning and punching are made while feeding the sheet in the reverse direction.

A case wherein a program in which the positioning and feeding of the sheets are made in the forward direction is selected will be described hereunder. More particularly, at step 190, a code [N2010 G02] is read out, and in accordance with the content thereof the result of judgment at step 192 included in step 191 becomes YES to set the flag FVC to and to rest the mark number MK to 1 at step 222. Then the program returns to step 190 via a judging step. Then at step 190, a code [N2020 G00 X(Xpl)Y(Ypl)] is read out and depending upon the content thereof, the results of judgments at step 195 included in step 191 and at step 208 become YES respectively. Then, the program advances to step 218.

At step 218, instructions Xpl and Ypl are corrected in the same manner as above described and at step 210, the corrected instructions are set in the servo-instructor. A loop servo-operation is made at step 203-205 and when the positioning is completed, the program returns to step 190 via judging steps 205 and 206.

Then at step 190, a code [N2030 M03] is read out and according to the content thereof, the result of judgment at step 196 included in step 191 becomes YES to start the press machine at step 219. Since flag FVC=2 the results of judgments at step 220 and 223 become NO and YES respectively, and at step 224, MK is incremented by one. The program returns to the first step 190 via judging step 206.

In this manner, while the sheets are fed forwardly, they are sequentially positioned and punched.

Upon completion of the punching of the first row, the center positions of the marks of the second row are detected and punched in the same manner. When punchings of all printed portions complete, at step 190, a code [N3000 M12] is read out and according to the content thereof the result of judgment at step 199 included in step 191 becomes YES to light the lamp 13 at step 225. Thereafter, the program returns to step 190 via a judging step 206. After that, at step 190 a code [N3010 M02] is read out so that the result of judgment at step 206 becomes YES, thus terminating the program.

The manner of selecting forward or reverse feeding of the sheets will be described.

Figure 48:
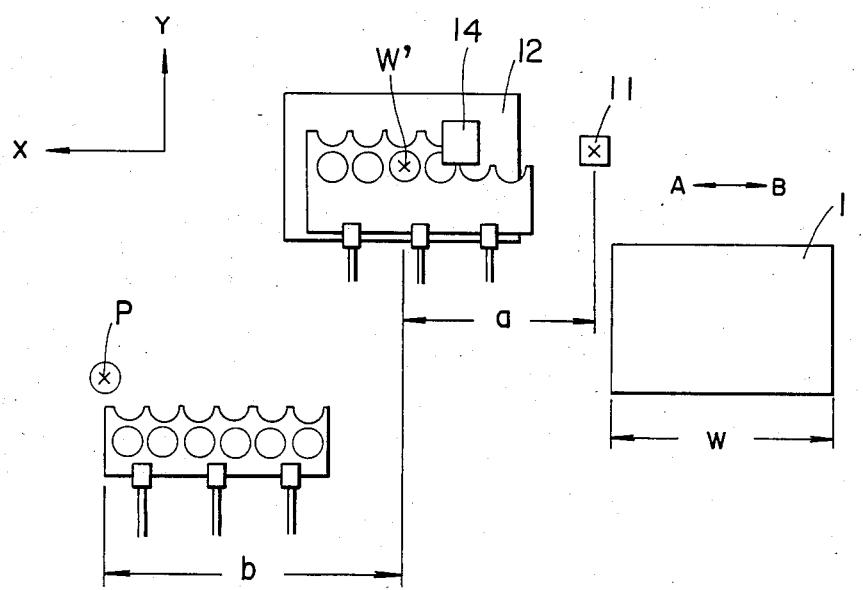
FIG. 48 is a diagrammatic representation showing the positional relationships among the bolster of the press machine, a camera and a scrap accumulating station.

FIG. 48 shows the positional relation among bolter 12 of the press machine 10, camera 11 and a clamper 26 for discharging scrap. The clamper 26 is moved to move the front end P of the scrap clamped thereby. Let us denote the distance in the X direction between camera 11 and the punching center W' of bolster 12 by a, and the distance in X direction between the punching center W' and the position P by b. Feeding of the sheet 1 in direction A is the forward feeding, and that in direction B is the reverse direction.

Except the punching of the printing portions of the last row, the sheet 1 is reciprocated between the camera 11 and the punching center W'. When the sheet 1 is reversely fed at the time of positioning and punching, the stroke of the reciprocation can be minimized. At the time of forward feeding, when the width W of the sheet 1 is larger than the distance a, it is necessary to punch the sheet 1 after it has been returned by a difference (w−a) in direction B, thus correspondingly increasing the stroke of feeding. When reverse feeding is adopted, irrespective of the distance a and the width W of the sheet 1, it is possible to always minimize the stroke of feeding.

The steps of feeding the sheet 1 are as follows. The center positions of the marks of the first row are sequentially detected starting from the left end mark M while the sheet 1 is being fed forwardly. (see FIG. 13a).

After completion of the detection of the center positions of the marks of the first row, the sheet 1 is reversely fed for the purpose of positioning the right hand printed portion of the first row at the punching center W' of the bolster 12 (see FIG. 13b)

After punching of the printing portion 1a of the first row, the sheet 1 is moved in a direction shown by an arrow in FIG. 13c to position the mark M at the left end of the second row to a position just beneath camera 11 (see FIG. 13d) to control the printed portion 1a of the second row in the same manner as above described. The bolster 12 is provided with a lower die 14 of a scrap cutter (see FIG. 48) so as to cut the scrap remaining after punching at a time slightly later than the punching time, whereby the scrap does not interfere the feeding of the sheet 1.

When punching the printed portions of the last row, after completing the punching, it is necessary to move the front end of the scrap to position P in order to discharge the scrap. Which one of forward feeding and reverse feeding is suitable for minimizing the feed stroke will be described hereunder.

After completing the detection of the center positions of the marks of the last row, the sheet is positioned and punched and forwardly moved by SF to position P and when the sheet is positioned, punched, and reversely moved by SB to position P, the strokes SF and SE can be shown by the following equations.

$$SF = (a \overleftarrow{-} W) + \overleftarrow{W} + (b \overleftarrow{-} W), (w<a, \text{ and } w<b) \quad (12)$$

$$SF = (a \overleftarrow{-} W) + \overleftarrow{W} + (W \overrightarrow{-} b), (w<a \text{ and } w>b) \quad (13)$$

$$SF = (w \overrightarrow{-} a) + \overleftarrow{w} + (b \overleftarrow{-} W), (w>a, \text{ and } ww<b) \quad (14)$$

$$SF = (w \overrightarrow{-} a) + \overleftarrow{w} + (w \overrightarrow{-} b), (w>a \text{ and } w>b) \quad (15)$$

$$FB = \overleftarrow{a} + \overrightarrow{w} + \overleftarrow{b} \quad (16)$$

In these equations, arrows show direction of movements.

Comparing SB of equation (16) with SI of equations (12)-(15), we obtain $$(6)-(2) = 2w>0 \quad (17)$$

$$(6)-(3) = 2b>0 \quad (18)$$

$$(6)-(4) = 2a>0 \quad (19)$$

$$(6)-(5) = 2(a+b-w) \quad (20)$$

From these equations, it can be noted that in the cases of equations (17)-(19) forward feeding is advantageous, that in the case of equation (20) forward feeding is advantageous when (a+b) is larger than W, but reverse feeding is advantageous when (a+b) is smaller than W. Thus, except a case wherein W is smaller than (a+b), the forward feeding is desirable.

In this manner, forward feeding or reverse feeding is selected at the time of positioning and punching the sheet, especially the feed of the last row.

When positioning and punching are performed with forward feeding it is necessary to render inoperative the scrap cutter. Further, it is necessary to select the position of the scrap receiver such that scraps can be discharged in the forms of a lamp. When the automatic strip supply device (generally called a destacker) is located on the righthand side, the scrap receiver will interfere with the strip supply device so that it is advantageous to locate the scrap receiver on the lefthand site as shown in FIG. 48.

According to the method of feeding the sheets described above, the center position of a mask on a sheet is detected, the sheets are sequentially positioned at a punching position in accordance with the detected mark center position, and the scrap is discharged after completion of punchings of all printed portions, so that feed stroke of the strip in all steps described above can be minimized, thus decreasing operation cycle time.

What is claimed is:

1. In an automatic punching method comprising the steps of clamping with clamping means a sheet of material printed with a plurality of printing portions to be punched and a plurality of positioning marks near the printed portions with the printing portions and the positioning marks being arranged in a plurality of row; transferring the sheet of material in X and Y directions of rectangular coordinates so as to place the positioning marks within the view field of a visual sensor disposed at a predetermined position with respect to a press; detecting deviations between a reference position of the view field and center positions of the positioning marks with respect to the X and Y directions; positioning the printing portions with respect to a working position of the press based on the detected deviations; and punching the printing portions from the sheet of material, and further performing the steps of;

painting a mark corresponding to a defective printing portion detected beforehand by visual inspection when printing of the printing portions and positioning marks are completed so as to change the area of a positioning mark corresponding to the defective printing portion;

detecting whether or not the positioning mark corresponding to a defective printing portion is painted;

storing the numbers of the positioning marks which are detected to be defective; and classifying the printing portions into normal and defective ones based on the numbers of the positioning marks thus stored.

2. The automatic punching method according to claim 1 wherein the classifying step is one which automatically classifies the punched products into satisfactory products and defective products based on the number of stored positioning marks.

3. The automatic punching method according to claim 1 wherein the classifying step is one which avoids punching the printing portions whose numbers are stored.

4. The automatic punching method according to claim 1 further comprising the steps of alarming when said stored mark number continue more than a predetermined number and then stopping the operation of the press.

5. The automatic punching method according to claim 1 wherein each painted mark is detected by calculating the area of the mark, and detecting the fact that the calculated area exceeds the area of an unpainted mark by a predetermined value.

6. In an automatic punching apparatus of the type including means for printing on a sheet of material a plurality of printed portions to be punched, and a plurality of positioning marks near said printed portions, said printed portions and said marks being arrayed in a plurality of rows; clamping means for clamping said printed sheet; means for moving said clamping means in X and Y directions of rectangular coordinates of a table; a visual sensor provided for a press machine for detecting center positions of said marks; and means for positioning said printed portions on said press machine for punching said printed portions, the inprovement which comprises sucking means for sucking said sheet on said table; means for obliquely moving said sucking means for a predetermined distance with respect to said clamping means; stop means engaged by an edge of said sheet moved by said moving means for correcting an attitude of said sheet, said sucking means causing adjacent edges of said sheets to abut against said stop means and said clamping means for positioning said sheets, said clamping means including a clamp carrier movable in X and Y directions of rectangular coordinates; a clamper support pivotally supported by said clamp carrier to be rotatable in a X-Y plane; clampers mounted on said clamper support for clamping therebetween said sheet; and angle correcting means for rotating said clamper support.

7. The apparatus according to claim 6 wherein said angle correcting means comprises means for defining a cam opening through said clamper support, a cam in contact with said cam opening, a handle shaft carrying said cam and pivotally carried by said clamp carrier, and an angle correcting handle secured to said handle shaft.

* * * * *